United States Patent
Willis et al.

(10) Patent No.: US 8,812,958 B2
(45) Date of Patent: Aug. 19, 2014

(54) METHODS AND APPARATUS FOR ANALYZING A SOCIAL NETWORK

(75) Inventors: Bernard P. Willis, San Francisco, CA (US); Babak Yazdani, Potomac, MD (US)

(73) Assignee: Saba Software, Inc., Redwood Shores, CA (US)

( * ) Notice: Subject to any disclaimer, the term of this patent is extended or adjusted under 35 U.S.C. 154(b) by 162 days.

(21) Appl. No.: 13/423,103

(22) Filed: Mar. 16, 2012

(65) Prior Publication Data

US 2013/0212479 A1 Aug. 15, 2013

Related U.S. Application Data

(60) Provisional application No. 61/597,808, filed on Feb. 12, 2012.

(51) Int. Cl.
*G06F 15/177* (2006.01)

(52) U.S. Cl.
USPC .......................................... 715/736

(58) Field of Classification Search
None
See application file for complete search history.

(56) References Cited

U.S. PATENT DOCUMENTS

| | | | |
|---|---|---|---|
| 2005/0021873 A1* | 1/2005 | Papadimitriou et al. | 709/250 |
| 2009/0024747 A1* | 1/2009 | Moses et al. | 709/228 |
| 2010/0132049 A1* | 5/2010 | Vernal et al. | 726/27 |
| 2011/0113086 A1* | 5/2011 | Long et al. | 709/203 |
| 2011/0238755 A1* | 9/2011 | Khan et al. | 709/204 |
| 2011/0296004 A1* | 12/2011 | Swahar | 709/224 |

OTHER PUBLICATIONS

Smith, M.; Hansen, D.L.; Gleave, E., "Analyzing Enterprise Social Media Networks", International Conference on Computational Science and Engineering, 2009, vol. 4, pp. 705-710, Aug. 29-31, 2009.

* cited by examiner

*Primary Examiner* — William Bashore
*Assistant Examiner* — Rayeez Chowdhury
(74) *Attorney, Agent, or Firm* — Wolf, Greenfield & Sacks, P.C.

(57) ABSTRACT

Techniques are disclosed for analyzing a social network having a plurality of members, each member having declared a connection with each of one or more other members of the social network. Exemplary techniques include monitoring activity performed by members on the social network, the monitored activity including actions other than the declaring and undeclaring of connections between members. A graphical representation of at least a portion of the social network may be computed to include at least one indication of the monitored activity.

54 Claims, 16 Drawing Sheets

US 8,812,958 B2

METHODS AND APPARATUS FOR ANALYZING A SOCIAL NETWORK

CROSS-REFERENCE TO RELATED APPLICATIONS

This application claims a priority benefit, under 35 U.S.C. §119(e), to U.S. Provisional Application No. 61/597,808, entitled "Dynamic Network Analysis," filed Feb. 12, 2012, which is incorporated herein by reference in its entirety.

BACKGROUND

In sociological terms, a social network is formed of a collection of people who have social connections with each other. In recent years, computerized social networking services have emerged to facilitate the building of social networks and to host electronic interactions between members of social networks. Typically, each user registered with a computerized social networking service creates an online representation of him/herself, called a "profile," that contains biographical and other information about the user. The user then creates an online representation of his/her social network by declaring connections with other users registered with the social networking service. For example, a first user might declare a connection with a second user by designating the second user as a "friend" or a "contact," or by choosing to "follow" the second user on the computerized social networking system. The first user's profile maintained by the social networking system often includes a list of other users who are "friends" or "contacts" of the first user, or whom the first user is "following." Often the social networking service imposes a requirement that both users must declare a mutual connection before the connection will be recognized and listed on the users' profiles, or before it will be publicized to other users. For example, when the first user designates the second user as a "friend," the second user may be required to accept the first user's "friend" request before the two users will be listed online as "friends." Declared connections can also later be undeclared, severing the link between the users' online profiles. For example, a first user who is a "contact" of a second user might later undeclare the connection by indicating that the second user is no longer a "contact," with the result that each user is then removed from the list of the other user's "contacts" on the other user's profile.

Social network analysis applies network theory to the sociological study of social networks. A typical social network can be represented graphically as a collection of nodes and edges. As applied to a computerized social networking service, each node in the network analysis graph can represent a user with a profile registered with the online social networking system. Each edge connecting two nodes in the graph can represent a declared connection between the two users represented by the two nodes. Such network graphs have been used as tools for the visualization of social networks, to allow an observer or researcher to get a sense of the network's overall structure formed by the connections between and among its members.

SUMMARY

One type of embodiment is directed to a method for analyzing a social network having a plurality of members, each member having declared a connection with each of one or more other members of the social network, the method comprising: monitoring activity performed by members on the social network, the activity comprising actions other than declaring and undeclaring of connections between members; and computing, using at least one processor, a graphical representation of at least a portion of the social network, the graphical representation comprising at least one indication of the monitored activity.

Another type of embodiment is directed to apparatus comprising at least one processor, and at least one storage medium storing processor-executable instructions that, when executed by the at least one processor, perform a method for analyzing a social network having a plurality of members, each member having declared a connection with each of one or more other members of the social network, the method comprising: monitoring activity performed by members on the social network, the activity comprising actions other than declaring and undeclaring of connections between members; and computing a graphical representation of at least a portion of the social network, the graphical representation comprising at least one indication of the monitored activity.

Another type of embodiment is directed to at least one computer-readable storage medium encoded with instructions that, when executed, perform a method for analyzing a social network having a plurality of members, each member having declared a connection with each of one or more other members of the social network, the method comprising: monitoring activity performed by members on the social network, the activity comprising actions other than declaring and undeclaring of connections between members; and computing a graphical representation of at least a portion of the social network, the graphical representation comprising at least one indication of the monitored activity.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
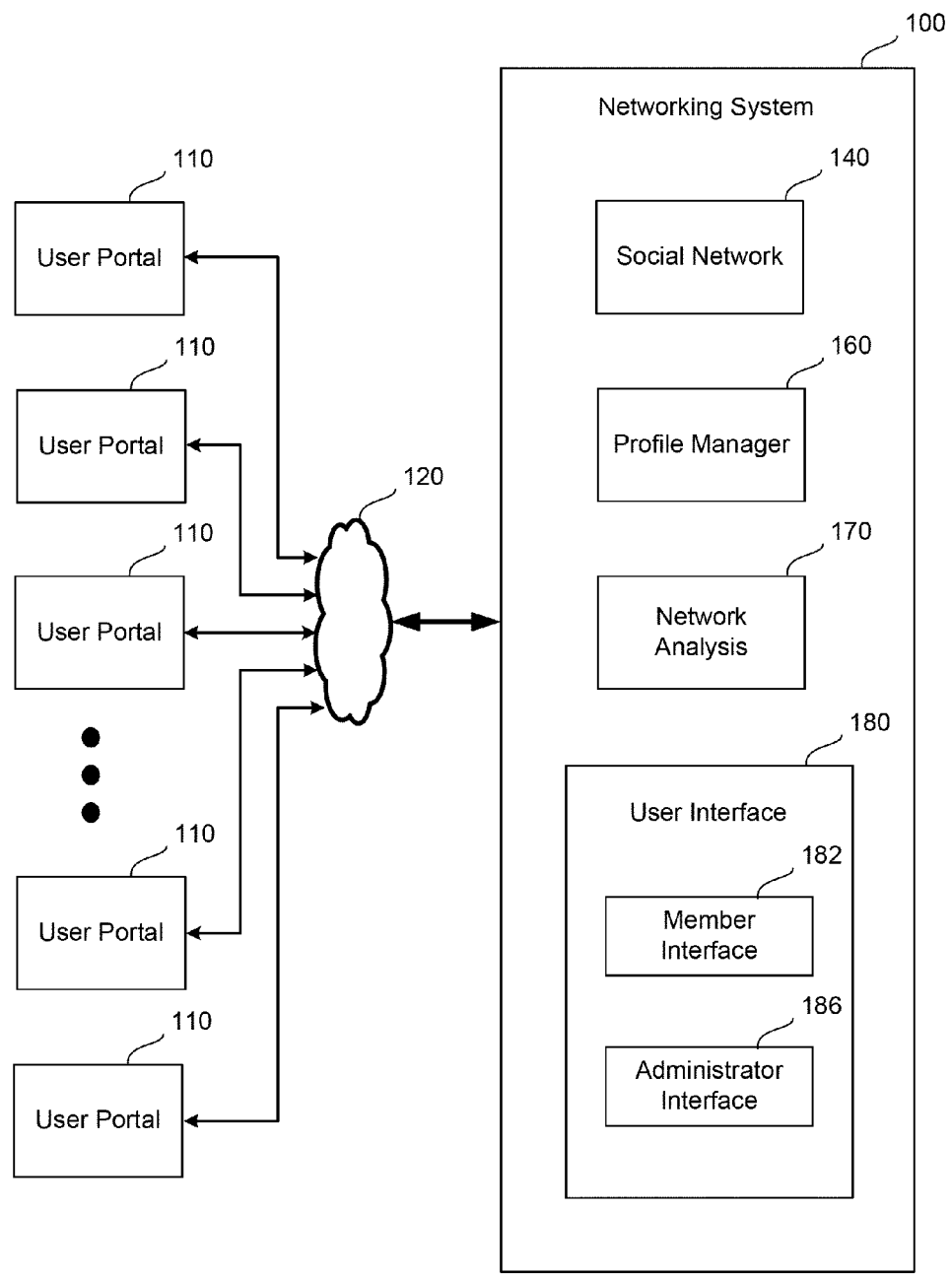
FIG. 1 is a block diagram illustrating an exemplary operating environment for a system in accordance with some embodiments of the present invention.

The inventors have recognized that conventional methods of analyzing social networks have been limited by their focus solely on declared connections between members of the social network. For example, two users of a computerized social networking system will often declare a connection with each other even though they do not often interact socially (whether online through the social networking system or offline), or even though they may not actually even know each other. Thus, declared connections between users of a social networking system often do not provide trustworthy information about the true structure of the underlying social network (e.g., about the true social relationships between the members of the network). Even when two users do actually interact with each other, the fact that they have a declared connection does not provide any information about the interactions between the users, such as the quantity, quality, or other characteristics of the interactions. The inventors have appreciated that a wide variety of insights and information may be obtained by analyzing social networks using techniques that monitor actual activity performed by members on the social network, including actions other than declaring and undeclaring of connections between members. The inventors have further appreciated that such techniques may provide the capability for automated and continuous updating of network analyses, such that routine activity on the social network can be monitored substantially in real time, and updated network analyses and/or visualizations may be generated on demand at any time with up-to-date information. By analyzing the social network using monitored actions that were performed by users as part of their everyday interaction with the social networking system (e.g., actions that were performed for purposes other than analyzing the social network), the analysis may be done quickly and without the need for asking all the members being analyzed to respond to surveys or other inquiries about their interactions with other members of the social network.

The inventors have also recognized that techniques for analyzing social networks may be particularly useful when applied to professional communities. As used herein, a "professional community" refers to a set of people whose membership is defined and/or restricted based at least in part on the people's professional relationships with a set of one or more employers. For example, a professional community may include employees of an employer or group of employers, or a subset of employees of an employer or group of employers. In other examples, a professional community may not be limited solely to employees. For instance, a professional community could be formed to include one or more employers' employees or a subset of those employees, plus one or more non-employees having particular professional relationships with the one or more employers. For example, a professional community could be formed to include employees, customers, business partners, and/or the board of directors of an employer. It should be appreciated that this is merely an example, and that professional communities as referred to herein are not limited to any particular set of categories of people, but may include any suitable people having any suitable form of professional relationship with one or more employers. In some embodiments, a professional community may be defined by and/or coextensive with a set of people having access to an online network with limited membership, where the online network is provided by, maintained by, sponsored by and/or otherwise associated with a set of one or more employer entities. However, other embodiments may not require any particular relationship between a professional community and any particular online network, as aspects of the invention are not limited in this respect.

In some embodiments, a social network may be maintained whose membership is coextensive with the membership of a professional community, or whose membership includes a subset of the members of the professional community. Such a social network, all of whose members are members of the professional community, is referred to herein as being internal to the community. By contrast, a social network whose membership is not restricted to members of the professional community, including a social network whose membership is open to the general public, is referred to herein as being external to the community. Hereinafter, the term "social network" will be used to refer to a computerized platform allowing a plurality of online users to communicate and to post personal information in online "profiles." However, the term may also be used to refer to the collection of people forming the membership of the community itself, and to the social relations and/or interactions between those members that may be analyzed through monitoring of the activity on the computerized social networking system.

Conventionally, attempts to obtain information about how work was performed in professional communities such as corporations, companies, or other employer organizations have been limited to consideration of a formal organizational chart (commonly known as an "org chart") for the employer organization. Typically, such an org chart has a hierarchical structure with directors, managers, and/or other people with supervisory authority within the organization (all herein referred to as "managers") appearing in upper levels of the hierarchy, and employees of lower rank within the organization (referred to herein as lower "job levels") appearing in lower levels of the hierarchy. Lines on the org chart typically connect each individual employee to the manager to whom that employee directly reports (e.g., the manager having direct supervisory responsibility for the performance of that employee), continuing up the hierarchical tree to the person to whom all others ultimately report (e.g., the chief executive officer).

The inventors have recognized that the conventional use of a formal org chart to examine how work is done within an organization involves the inherent assumption that employees work primarily with the managers to whom they report, or primarily with other employees who are members of the same manager team. (As used herein, the term "manager team" refers to the set of people including a manager and all of the employees who report to that manager, e.g., as specified on a formal org chart.) However, the inventors have appreciated that this is often an inaccurate assumption, as in many cases professional collaboration may occur between members of different manager teams, or between people at very different levels of the org chart hierarchy. The inventors have also recognized that the conventional org chart is relatively static and infrequently updated, and may not be useful for tracking day-to-day trends in collaborative activity. Furthermore, the inventors have appreciated that the strict hierarchy of the conventional org chart implies that higher-ranking (e.g., higher "job level") members of the organization are more important to the community than lower-ranking (e.g., lower "job level") employees. In reality, however, the inventors have recognized that certain employees at lower job levels may actually function importantly as the "glue" holding the community together, e.g., by promoting collaborative interactions and making the community as a whole more productive.

The inventors have thus appreciated that network analysis of a professional community may benefit from the use of techniques that monitor data about actual collaborative interactions that occur within the professional community, e.g., as conducted on a social networking system for the professional community. By disregarding the hierarchy of the org chart, and instead monitoring and analyzing how members of the community actually work together, some embodiments may provide access to information about strengths and weaknesses of the professional community that would not be available through conventional methods.

For example, an individual employee's job performance and resulting value to the employer organization would conventionally be evaluated through the traditional process of conducting performance reviews. A conventional performance review is typically an annual process in which individual employees are evaluated as to how well they have performed their jobs over the past year. Each employee's managers typically provide narrative reviews of the employee's job performance over the past year, subjectively rating the employee, e.g., on a scale from one to five. The inventors have recognized that these traditional methods of evaluation may be inadequate to identify and encourage the "movers and shakers" who have the potential for greatest positive impact on the community, particularly if these people are not already in positions of leadership. For instance, a traditional performance review that only evaluates how well a person is performing the specific tasks required by the person's current job may not be effective in identifying and cultivating leadership potential in a person whose current job does not involve the performance of leadership-oriented tasks. The inventors have recognized that a person's capacity to impact a community may be better assessed by expanding the scope of evaluation to consider informal aspects such as interaction with and learning from other members of the community in social contexts. As used herein, the term "social" is not restricted to contexts unrelated to work, but is used to refer to communication between and among people, whether or not related to the performance of those people's jobs. The inventors have recognized that a novel holistic approach to evaluating members of a community, one that accounts for informal interaction in addition to formal job requirements, may be more effective in measuring a person's influence on the community, and in recognizing hidden talent in aspects outside of a person's current job description. For example, the inventors have appreciated that the analysis of a social network (e.g., one used by a professional community), with particular focus on actual interaction data, may be beneficial in identifying valuable individuals who function as "hubs" promoting a large amount of collaboration within the community.

The inventors have further appreciated that analysis of social network interaction data may allow for targeted study of collaborative strengths and weaknesses of a social network such as a professional community. For instance, by breaking down interaction data based on natural segmentations of the community, analyses may be generated to investigate the level of segmentation or integration of the community as a whole. For example, geographic boundaries form natural lines of segmentations for social communities. By considering the geographical regions in which members of the social network are located, the network may be analyzed to determine the degree to which interactions are impeded by geographical boundaries. In one example, if network members in two different geographical regions tend to interact only with members within their own region, and only a few key individuals provide the major connections (e.g., in terms of actual interactions) between the two distinct geographical clusters, then those key individuals may be identified as important links in the network. If the social network represents a professional community, for example, an employer may be motivated by this analysis to identify and encourage these key individuals, and perhaps to promote them, or to implement a contingency plan to prevent network dysfunction if any of those individuals should leave the community.

The inventors have appreciated that analysis of social networking interactions within a professional community may provide much useful information for making decisions regarding human resources for the benefit of the community as a whole. For example, when an employer organization must make downsizing decisions, it may be beneficial to identify individuals who are important connectors (e.g., "hubs") within the professional community (e.g., who facilitate collaboration and/or other productive activity), and to ensure that those members are not terminated from the community. Even if not downsizing, it may be prudent to invest in and/or otherwise encourage members of the community who function as activity hubs, and/or to leverage them for new projects and/or initiatives. On the other hand, it may also be useful to identify, through network analysis, those members of the community who are not contributing as much as others. Such members may be targeted for remedial measures such as extra training or mentoring, or if appropriate may be pruned from the community by termination of employment or otherwise. The inventors have further appreciated that network visualization techniques using analyses of monitored interactions may be used to predict the effects on the network of hypothetical scenarios, such as the removal of a certain individual from a professional community. The foregoing are merely examples, as the needs of different communities may suggest many different uses for techniques for analyzing social networks described herein.

The inventors have additionally appreciated that individual members of a social network may derive personal benefit from analysis of their networks based on interaction data. For example, an individual member may use such network analyses to get a sense of his/her contribution to the community as compared to other members, and to determine how to improve his/her value to the community. Members may also be able to identify other individuals who are strong collaborators, who could be beneficial contacts and/or mentors. In another example, if a member was interested in establishing a relationship with a particular individual or in being introduced to that individual, the member could determine from a network analysis what other members are most connected with that individual (e.g., what other members interact most with that individual) and might be able to provide the best introduction. Again, these are merely examples, and many other opportunities may present themselves depending on the characteristics, goals, etc. of a particular social network and/or of its members.

Accordingly, some embodiments described herein relate to techniques for analyzing a social network, in ways that may address one or more of the above-discussed shortcomings of traditional network analysis methods, and/or that may provide one or more of the foregoing benefits. However, aspects of the invention are not limited to any of these benefits, and it should be appreciated that some embodiments may not provide any of the above-discussed benefits and/or may not address any of the above-discussed deficiencies that the inventors have recognized in conventional techniques.

In some embodiments, a social network (which may or may not be internal to a professional community) may be analyzed by monitoring activity performed by members on the social network. In some embodiments, the activity monitored may include actions other than the declaring and undeclaring of connections between members. For example, a member of a social network may declare a connection with another member by designating that other member as a "friend," a "contact," and/or the like, or by "following" that other member. A member declaring an affiliation with a defined group of members within the social network may also be considered a declaring of a connection with those members. Members may undeclare connections by indicating that they are no longer "friends," "contacts," "followers," group members, or the like. In some embodiments, such declaring and undeclaring of connections may not be considered as part of the activity monitored for analyzing the social network. As discussed above, it may be that declared connections are not particularly informative as to what collaboration is actually occurring within the social network. In some embodiments, therefore, declared connections may be excluded from the network analysis. Other embodiments may consider declared connection data, however, as some aspects of the invention are not limited in this respect.

In some embodiments, monitoring activity on the social network may involve determining measures of members' influence on other members of the social network. Examples of actions that may be considered in determining measures of influence include members contributing objects to the social network, members sharing contributed objects with other members on the social network, members viewing and/or performing other actions on objects contributed to the social network, members providing impressions on other members on the social network, and (in embodiments that consider such data) members declaring connections with other members on the social network, among others. These examples are discussed further below.

In some embodiments, one or more graphical representations may be generated as visualizations of the social network or of one or more portions thereof. In some embodiments, the graphical representation may include one or more indications of the monitored activity on the social network. For example, in some embodiments, a social network or portion thereof may be represented graphically as a set of nodes and connectors. In some examples, each node may represent an individual member of the social network, and a visual characteristic of each node (e.g., its size, or other visual characteristic) may be made to represent a measure of that member's influence within the social network. In some examples, connectors between nodes in a network graph may represent activity related to the connected members' influence on each other, and a visual characteristic of each connector (e.g., its thickness, or other visual characteristic) may be made to represent one or more measures of such influence. In some examples, nodes in a network graph may be positioned in a layout relative to one another, such that the proximity between any two nodes may be representative of the strength of the connection between those two nodes (e.g., representative of one or more measures of influence between the members represented by the two nodes). However, the foregoing are only examples, and not all embodiments are limited to any of the foregoing.

In some embodiments, an interface may be provided to allow a member of a social network or another user to view one or more types of network analysis visualizations generated from the monitored activity on the social network. In some embodiments, such an interface may also provide configuration options selectable by the user to specify particular information of interest to be displayed. For example, in some embodiments, an option may be provided to apply a filter or other form of segmentation analysis to network data, based on one or more default and/or configurable breakdown parameters. Examples of suitable parameters include, but are not limited to: location, organization, job type, job level, and group parameters. In other examples, an option may be provided to visually distinguish (e.g., by highlighting, or other form of visual emphasis) entities within the network having characteristics of interest, such as network hubs and/or fringes (e.g., members whose measures of influence are above and/or below default and/or configurable thresholds), new members of the network, or any other information of interest.

In some embodiments, social network analysis information may be utilized to evaluate individual members of a professional community. In some embodiments, a person's level of participation in a social network may be measured in a quantitative way, as discussed above. Examples include measuring the number of other people to which the person is linked within the social network; the number, frequency and/or type of interactions the person has with other people on the social network; and the number, frequency and/or type of object-related interactions the person has on the social network. These and other examples are discussed below. In some embodiments, such quantitative information may be considered as measurements of the person's influence on others within the social network, and/or of others' influence on the person within the social network.

In some embodiments, the quantitative information regarding the person's participation in one or more social networks may be combined with one or more other inputs to compute a score indicating the person's value to the professional community. Examples of suitable other inputs include measures of the person's compliance with learning requirements, the person's performance of job requirements, the person's skill set, and other inputs as described below. In some embodiments, a set of weights may be configured to be applied to these multiple input categories (hereafter referred to as "facets") in computing the person's combined evaluation score, such that some facets may be weighted more heavily than others in the overall score. In some embodiments, the same set of weights for the same set of facets may be applied in evaluating different members of the professional community, to promote consistency and the ability to benchmark with relation to other members of the professional community.

In some embodiments, a member's evaluation score, and/or the facets and/or individual input measurements used in computing the score, may be displayed or otherwise indicated to the member to allow him/her to understand his/her current valuation within the professional community. In some embodiments, access to this information may be provided at the member's convenience throughout the year; however, aspects of the invention are not limited to any particular timing or frequency of access to a member's evaluation score. In some embodiments, a member may be provided access to his/her evaluation score outside of the context of a formal performance review, such that he/she has a chance to work on improving the score before the formal review process actually occurs. In some embodiments, an interface may be provided that allows the user to input hypothetical changes to the individual measurements and/or facets contributing to his/her evaluation score, and an indication may be provided of how the computed score would change if the hypothetical input changes were to be actually implemented through the user's actions in life.

It should be appreciated that the foregoing descriptions are by way of example only, and aspects of the invention are not limited to providing any or all of the above-described functionality, although some embodiments may provide some or all of the functionality described herein.

The aspects of the present invention described herein can be implemented in any of numerous ways, and are not limited to any particular implementation techniques. Thus, while examples of specific implementation techniques are described below, it should be appreciate that the examples are provided merely for purposes of illustration, and that other implementations are possible.

One illustrative application for the techniques described herein is for use in a system for analyzing a social network. An exemplary operating environment for such a system is illustrated in FIG. 1. The exemplary operating environment includes a networking system 100, which may be implemented in any suitable form, as aspects of the present invention are not limited in this respect. For example, system 100 may be implemented as a single stand-alone machine, or may be implemented by multiple distributed machines that share processing tasks in any suitable manner. System 100 may be implemented as one or more computers; an example of a suitable computer is described below. In some embodiments, system 100 may include one or more tangible, non-transitory computer-readable storage devices storing processor-executable instructions, and one or more processors that execute the processor-executable instructions to perform the functions described herein. The storage devices may be implemented as computer-readable storage media (i.e., tangible, non-transitory computer-readable media) encoded with the processor-executable instructions; examples of suitable computer-readable storage media are discussed below.

As depicted, system 100 includes social network component 140, profile manager 160, network analysis component 170 and user interface 180. Each of these processing components of system 100 may be implemented in software, hardware, or a combination of software and hardware. Components implemented in software may comprise sets of processor-executable instructions that may be executed by the one or more processors of system 100 to perform the functionality described herein. Each of social network component 140, profile manager 160, network analysis component 170 and user interface 180 may be implemented as a separate component of system 100 (e.g., implemented by hardware and/or software code that is independent and performs dedicated functions of the component), or any combination of these components may be integrated into a single component or a set of distributed components (e.g., hardware and/or software code that performs two or more of the functions described herein may be integrated, the performance of shared code may be distributed among two or more hardware modules, etc.). In addition, any one of social network component 140, profile manager 160, network analysis component 170 and user interface 180 may be implemented as a set of multiple software and/or hardware components. Although the example operating environment of FIG. 1 depicts social network component 140, profile manager 160, network analysis component 170 and user interface 180 implemented together on system 100, this is only an example; in other examples, any or all of the components may be implemented on one or more separate machines, or parts of any or all of the components may be implemented across multiple machines in a distributed fashion and/or in various combinations. It should be understood that any such component depicted in FIG. 1 is not limited to any particular software and/or hardware implementation and/or configuration.

In some embodiments, networking system 100 may be accessible by one or more users via one or more user portals 110. User portals 110 may be implemented in any suitable manner, including as one or more computers and/or terminals, which may be local to and/or remote from networking system 100, as aspects of the present invention are not limited in this respect. User portals 110 may be connected to and/or may communicate with networking system 100 via any suitable connection(s), including wired and/or wireless connections. In the example depicted in FIG. 1, user portals 110 transmit data to and receive data from networking system 100 through network 120. Network 120 may be any suitable network or combination of networks, including local and/or wide area networks, and may make use of any suitable wired and/or wireless connections. For example, network 120 may be a private network, such as a professional network accessible to members (e.g., employees, customers, partners, etc.) of a professional community having professional relationships with one or more employers, or a public network such as the Internet, or a combination of both types of networks.

In some embodiments, users may use user portals 110 to access networking system 100 via user interface 180, and networking system 100 may in turn collect data regarding the users' use of the tools provided by networking system 100. Users accessing user portals 110 may include any members of a social network supported by networking system 100, and optionally any other people for whom access to networking system 100 is considered appropriate. When a user accesses networking system 100 to manage the user's own profile, to perform social interactions on the social network, and/or to view analyses of the social network or portions thereof, the system may treat that user as a generic member of the social network. When a user accesses networking system 100 to configure the standard processing performed by network analysis component 170 and/or by other components of networking system 100, the system may treat that user as an administrator, provided the user has the required access authorization for that category of user. It should be appreciated, however, that user categories such as "administrator" and generic "member" are merely examples, and other designations are possible. In some alternative embodiments, users may not be designated with predefined categories, but may instead have collections of any of various available access rights that determine what aspects of networking system 100 they are authorized to use and/or to configure.

In some embodiments, user interface 180 may be configured, e.g., through appropriate programming of one or more processors of networking system 100, to provide data to and receive data from a user portal 110 in accordance with the access rights of the current user engaging that portal. For example, in some embodiments, user interface 180 may have different subcomponents for presenting member interface 182 and administrator interface 186.

In some embodiments, functions enabled by member interface 182 may be accessible to all people who are members of the social network, which may also include administrators in addition to generic members. Member interface 182 may provide access, for example, to functions of networking system 100 that provide analyses of the social network or portions thereof, as described below.

In some embodiments, functions enabled by administrator interface 186 may be accessible only to users responsible for configuring various aspects of networking system 100, such as, for example, parameters to be applied by network analysis component 170 and/or authorization requirements to be applied to the accessibility of network analyses through member interface 182. In some embodiments, administrators may access functions enabled by administrator interface 186 by logging in with credentials, such as user identifiers and/or passwords, that establish their access rights as administrators.

As discussed above, in some embodiments, any member of a social network, including an administrator, can be considered a generic member, and can view analyses related to his/her participation in the social network using techniques described herein. In some embodiments, a person may belong to a social network as a generic member and an administrator simultaneously. Such a user may, for example, perform administrator functions by accessing administrator interface 186 (with the appropriate credentials), and access the user's own member functions via member interface 182. This is only an example, however, as aspects of the invention are not limited to any particular configuration for user interface 180. In some alternate embodiments, user interface 180 may not have separate components for member and administrator interfaces, but may instead present a common interface with certain functions being disabled for users having inadequate access rights, or being visible only to users with appropriate access rights. Commonly, a social network may need only a few administrators to configure and/or maintain networking system 100, and may have significantly larger numbers of generic members. However, this is only an example, as aspects of the invention are not limited to any particular hierarchical structure for a social network. In some embodiments, networking system 100 may not treat users as generic members and administrators, but may regulate access rights in any suitable way, such as on an individual basis. Also, in some embodiments, certain roles, such as some administrator roles, may be performed by people who are not official members of the social network, such as by human resources and/or computer programming specialists specifically engaged to perform administrative functions with respect to networking system 100.

In some embodiments, members may access networking system 100, e.g., via network 120 and user interface 180, and may interact with components of networking system 100 as part of their regular professional participation in a professional community. In some embodiments, these interactions may be monitored or otherwise aggregated and/or analyzed as part of analyzing a social network corresponding to the professional community, and/or as part of computing evaluation scores for individual members of the professional community. Any suitable interactions with and/or actions performed via any suitable component(s) of networking system 100 may be monitored and/or otherwise utilized in analyzing the social network and/or in evaluating a member of the professional community, as aspects of the invention are not limited in this respect. However, some embodiments may provide for analysis and/or evaluation with reference to members' use of particular components such as social network component 140 and/or profile manager 160, as described further below.

In some embodiments, social network component 140 may provide, e.g., through appropriate processing performed by one or more processors of networking system 100, infrastructure for running and/or maintaining a computerized networking platform usable by members of the social network. As discussed above, the social network may provide an online space for each member to build a unique profile containing personal information. The social network may also provide the capability for members to link their profiles with the profiles of other members with whom they are acquainted, with whom they share a manager group and/or job title, and/or with whom they have any other suitable association. Such links may be represented, for example, by listing on a member's profile the names and/or other information of the other members to whom the member is linked, or in any other suitable way. Alternatively or additionally, the social network may provide the capability for a member to "follow" one or more other members, by receiving suitable notifications when the other members being followed post information to their profiles or to other spaces within the social network. Actions performed for the main purpose of publicizing a relation between members, such as following other members, linking profiles, listing contacts, and joining groups, may be considered "declaring connections" between members of the social network.

Items of information posted to a social network are referred to herein as "objects," and may include free text, posts to blogs, discussion topics, links to electronic files, links to webpages, event postings, and/or any other item of information suitable for posting to a social network. In some embodiments, once an object has been contributed to a social network by being initially posted by a member, it may be shared with other targeted members within the social network. For instance, once a first member has contributed an object by posting it to the first member's profile, to a discussion board or to any other suitable space on the social network, a second member who notices the posted object may direct a third member to view the object (i.e., the second member may share the object with the third member). Such sharing may be accomplished in any suitable way—for instance, by allowing the second member, upon viewing the object, to send a message to the third member within the social network, containing a link to the object. In some embodiments, the social network may allow members to perform any of various actions on objects contributed to the social network, which may include viewing the object, sharing the object, rating the object, ranking the object, bookmarking the object, commenting on the object, and/or any other suitable action.

Alternatively or additionally, in some embodiments the social network may allow members to perform any of various actions on other members on the social network, which may include viewing a member's profile, sharing a member's profile, rating a member, ranking a member, bookmarking a member's profile, posting a comment or other object on another member's profile, providing an impression on a member, and/or any other suitable action. Providing an impression on another member may include posting to the social network a comment about a quality of the other member and/or about something the other member did, such as, "This person impressed me because she gave a great lecture yesterday," or "This person is a great mentor." It should be appreciated, however, that the foregoing are only examples, and any suitable social networking functions may be provided by one or more components of networking system 100, such as social network component 140, as aspects of the invention are not limited in this respect.

In some embodiments, profile manager 160 may be configured to store and/or maintain, e.g., through appropriate processing performed by one or more processors of networking system 100, unique profile information for individual members of the social network (which may or may not be internal to a professional community). Such profile information may include, for example, basic biographical information about the member and/or information about the member's current and/or previous jobs, which may be entered by the member, manager(s) and/or administrator(s) upon hiring the member, upon engaging the member for a particular job, and/or at any other suitable time. In some embodiments, a member may access profile manager 160, e.g., via user portal 110 and member interface 182, to view and/or update information in his/her profile. In some embodiments, the member's profile information may also be accessible to one or more managers and/or administrators, e.g., via user portal 110 and member interface 182 and/or administrator interface 186, respectively. In some embodiments, managers and/or administrators may have unlimited view and/or update access to member profiles, while in other embodiments, managers and/or administrators may have any of various suitable combinations of predetermined and/or configurable access rights to profiles of other members. In some embodiments, administrators may have view and/or update access to more member profiles than managers; for example, in some embodiments, manager access rights may be limited to the profiles of members within their own manager teams. Any suitable manager and/or administrator access rights to member profiles may be implemented, as aspects of the invention are not limited in this respect.

In some embodiments, certain members, managers and/or administrators may have access to view profile information of other members, but not to update or otherwise change the information. In some embodiments, a member's profile may be viewable by all members of the social network, while in other embodiments, view access to a member's profile may be limited in any suitable way, such as by job category, by manager team affiliation, and/or any other suitable criteria. In some embodiments, view and/or update access to a member's profile may be configurable by the member, manager(s) and/or administrator(s), such that certain other members can be designated for view and/or update access to the member's profile while others are not. In some embodiments, certain information within a member's profile may be viewable and/or updatable by others while other information is not, and certain information may be viewable and/or updatable only by certain other members. Such division of access rights to different information within a member's profile may be set by default, configurable by the member, manager(s) and/or administrator(s), and/or determined in any other suitable way. In some embodiments, a member may have "public" profile information viewable by other members of the social network, and different "private" profile information (which may overlap with the public information) viewable only to the member, or only to the member and limited other members, such as managers and/or administrators. Alternatively or additionally, a member's profile may have different (possibly overlapping) sets of non-public information viewable by different levels of managers and/or administrators. In some embodiments, a member's profile may even contain information that is not accessible to the member him/herself, but that is only accessible to one or more managers and/or administrators. The foregoing are merely examples, however, as aspects of the invention are not limited to any particular implementation of access to profile information. Access rights may be configurable in any suitable way, such as by default programming and/or via case-by-case specification of access rights, e.g., by an administrator or other suitable personnel.

In some embodiments, a member's profile information as stored and/or maintained by profile manager 160 may include information in the member's online profile stored and/or maintained by social network component 140, and/or profile manager 160 may have access to online profile information managed by social network component 140. In some embodiments, profile information managed by profile manager 160 may be coextensive with online profile information available to the social network; while in other embodiments, some information may be managed by profile manager 160 that is not available to the social network, and/or some information may be managed by social network component 140 that is not managed by profile manager 160. In some embodiments, profile manager 160 may function to manage all of a member's profile information, and may make some or all of that information available to the social network. These and any other suitable implementations of profile management are possible, as aspects of the invention are not limited in this respect.

In some embodiments, profile manager 160 may store and/or maintain, in a member's profile, information that may be used to determine one or more measures of the member's value to a professional community. Any suitable information may be used in this determination, as aspects of the invention are not limited in this respect, although some embodiments provide for the consideration of particular categories (facets) of information. Examples of suitable facets (i.e., categories of inputs used in computing an evaluation score for a member of a professional community), as described further below, include, but are not limited to, learning information, effectiveness information, informal engagement information, information regarding profile completion, information regarding skills, and external sources of information. It should be appreciated, however, that these are merely examples, and aspects of the invention are not limited to the inclusion of any of the foregoing facets in evaluating a member of a professional community.

In some embodiments, network analysis component 170 may be configured to monitor (e.g., through processing performed by one or more processors of networking system 100) activity performed by members on the social network, e.g., as processed, logged, and/or otherwise handled as data by social network component 140. Alternatively or additionally, social network component 140 may perform the monitoring function, and may communicate relevant data to network analysis component 170. In some embodiments, network analysis component 170 may be configured to utilize the monitored activity in analyzing the social network, such as by computing one or more graphical representations of the social network and/or portion(s) thereof. In some embodiments, network analysis component 170 may be configured to generate any of various different types of visualizations of the social network or of portion(s) thereof, depending on the analysis interests of the user requesting the visualization. In some embodiments, user interface 180 may be configured to allow a user to access network analysis component 170, and to request and view network visualizations (e.g., graphical representations of the social network and/or portion(s) thereof) generated by network analysis component 170. In some embodiments, information presented by user interface 180 and/or interactive graphical objects (e.g., buttons, icons, check boxes, input fields, drop-down menus, right-click menus, etc.) presented by user interface 180 may be transmitted to user portals 110 via network 120 and may be displayed on a display device of user portal 110. In turn, user input in any suitable form (e.g., mouse movements, clicks, text input, voice input, etc.) may be received by user portal 110 and transmitted via network 120 to user interface 180, to allow the user to submit instructions to and/or to otherwise interact with user interface 180 and/or other components of networking system 100 (such as network analysis component 170 and social network component 140).

Figure 2:
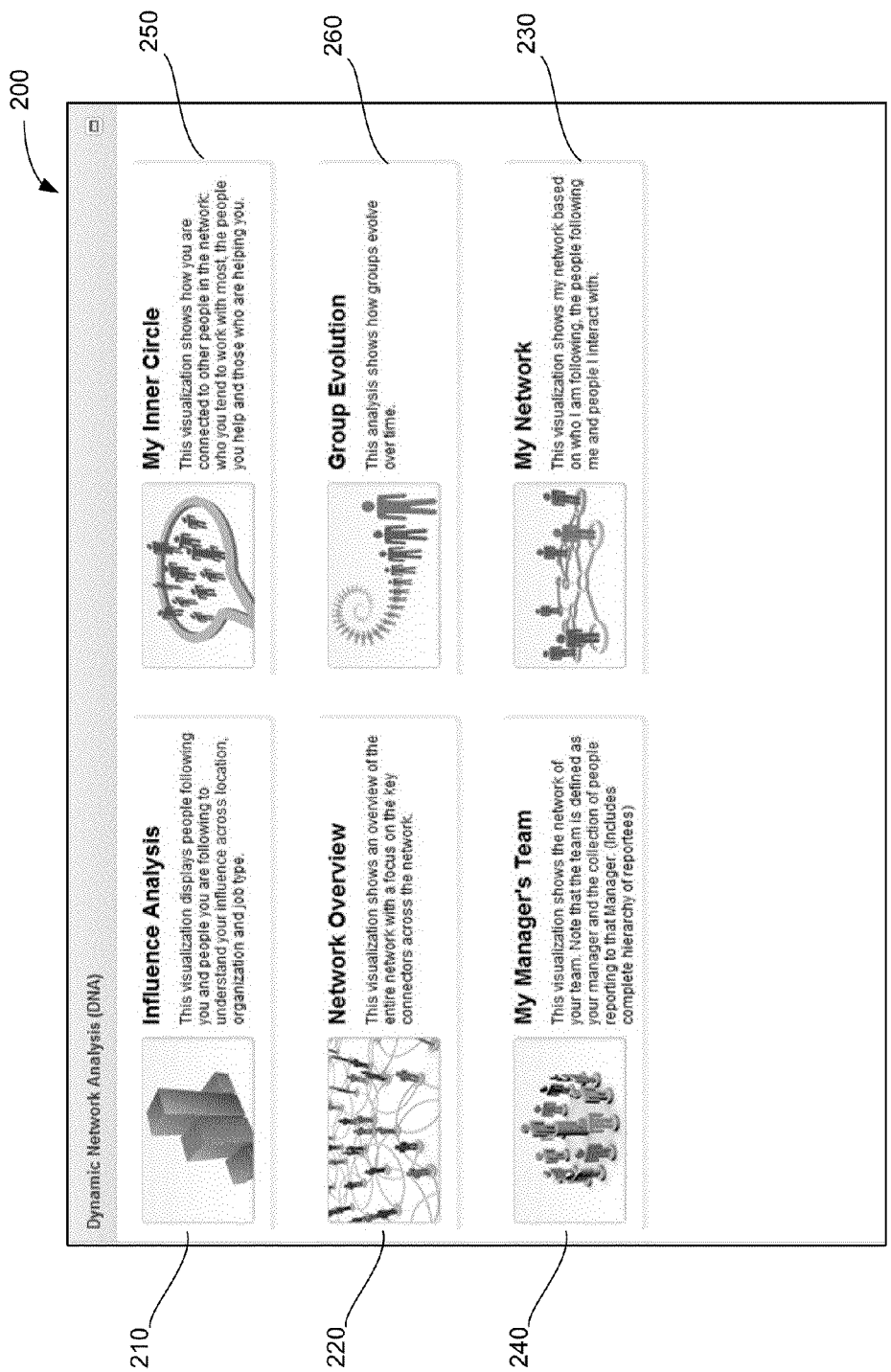
FIG. 2 illustrates an exemplary visualization menu in accordance with some embodiments of the present invention.

In some embodiments, user interface 180 may be configured to present a user (e.g., via network 120 and a display of user portal 110) with a selection of available visualization types for different types of analyses of the social network. As an example, FIG. 2 illustrates an exemplary menu 200 of visualization options that could be presented to a user via user interface 180. The illustration in FIG. 2 is merely one example, however. Visualization options may be presented to a user in any suitable way, as aspects of the invention are not limited in this respect. The exemplary menu of FIG. 2 presents a number of selectable buttons, each of which may be selected by the user by clicking on it with a mouse, and/or by any other suitable input method. However, aspects of the invention are not limited in this respect, and selectable visualization options may be presented to a user alternatively or additionally in any other suitable way, such as via text input, radio buttons, check boxes, drop-down menus, or any other suitable input. In general, references herein to particular forms of user input, as well as illustrations of particular implementations of user interfaces, are made by way of example only, and aspects of the invention are not limited to any particular form of user input to indicate analysis requests, parameters, and/or any other suitable user input.

Figure 3:
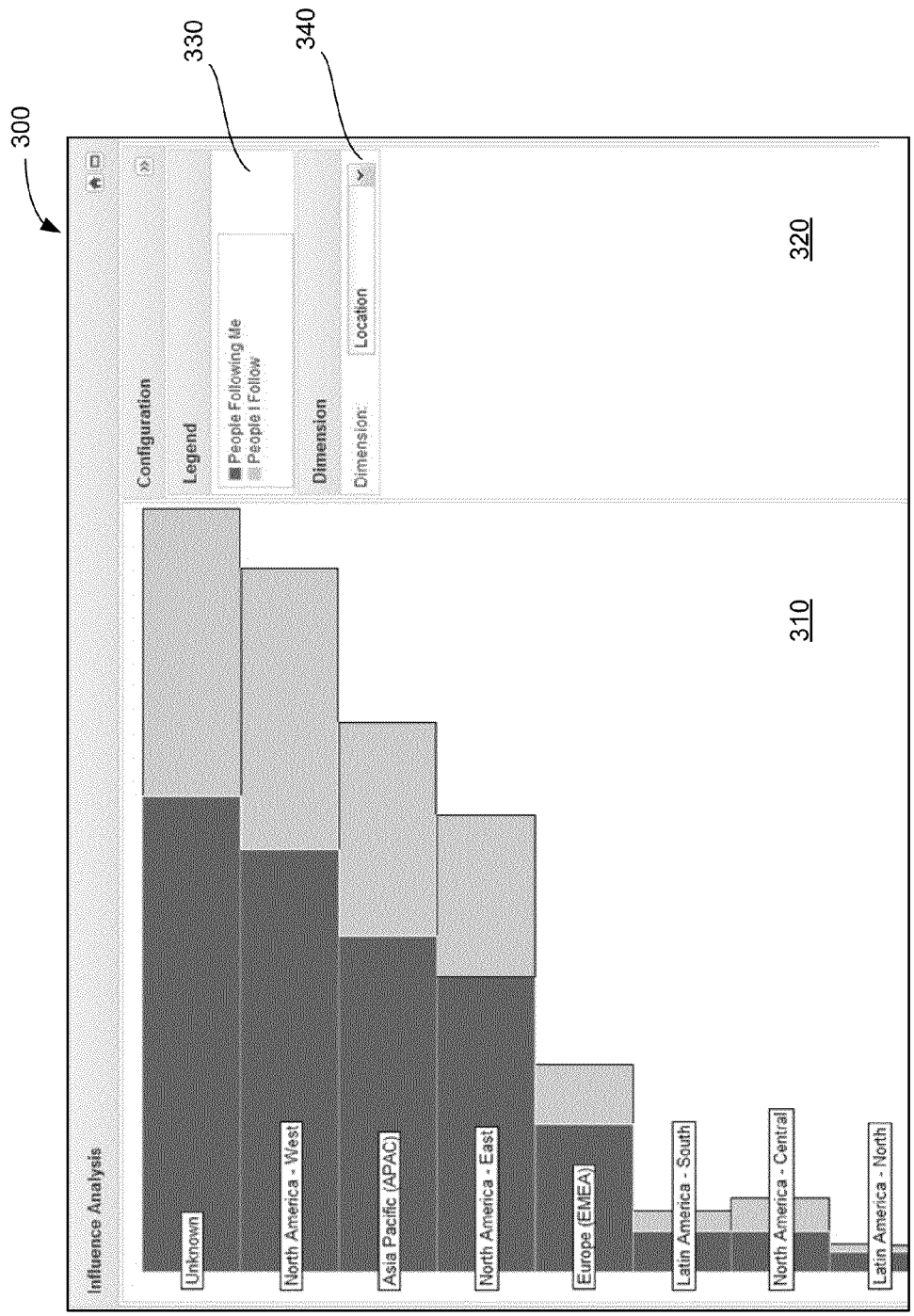
FIG. 3 illustrates an exemplary visualization of declared connections in accordance with some embodiments of the present invention.
Figure 4A:
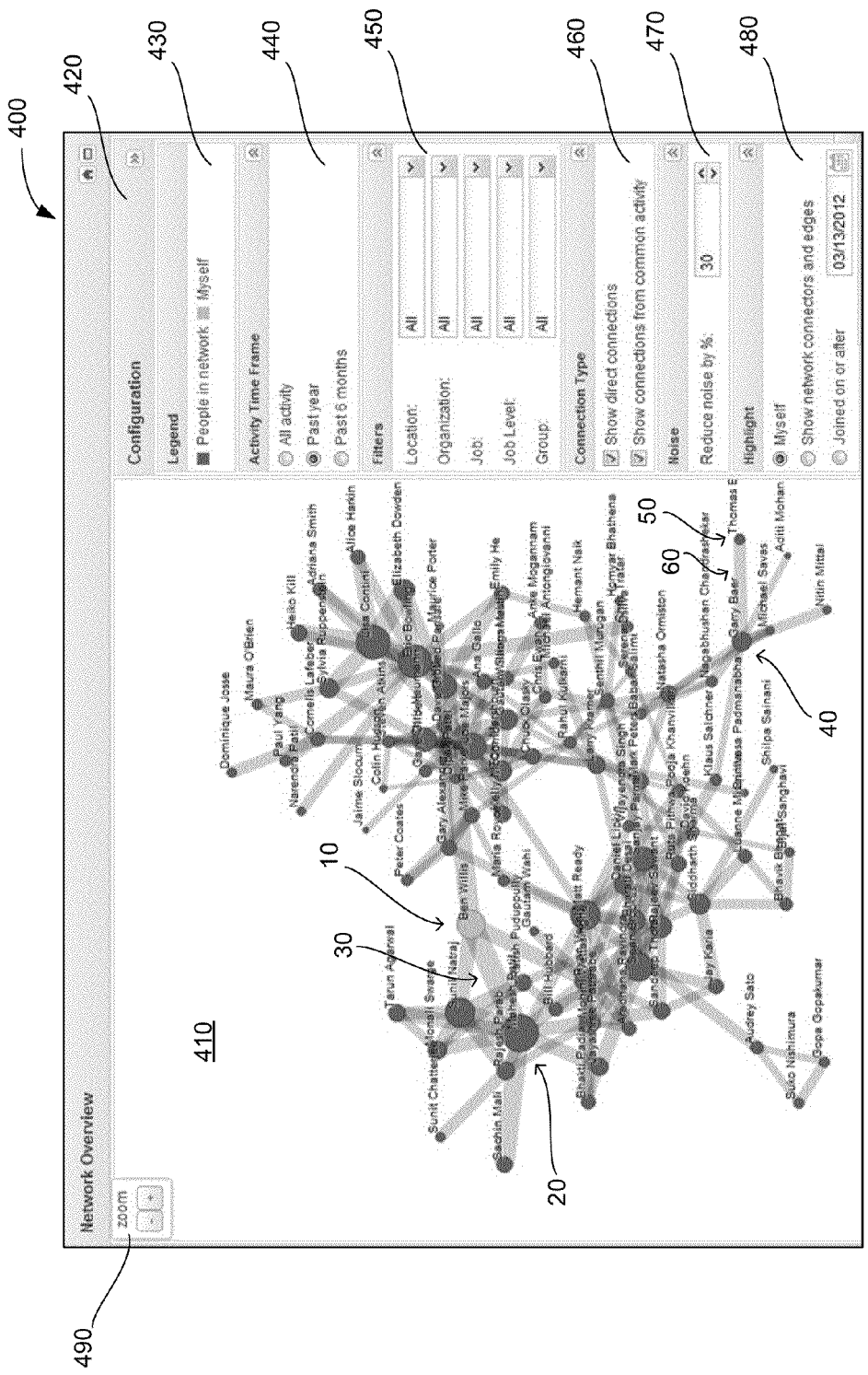
FIGS. 4A-4C illustrate an exemplary network visualization in accordance with some embodiments of the present invention.
Figure 4B:
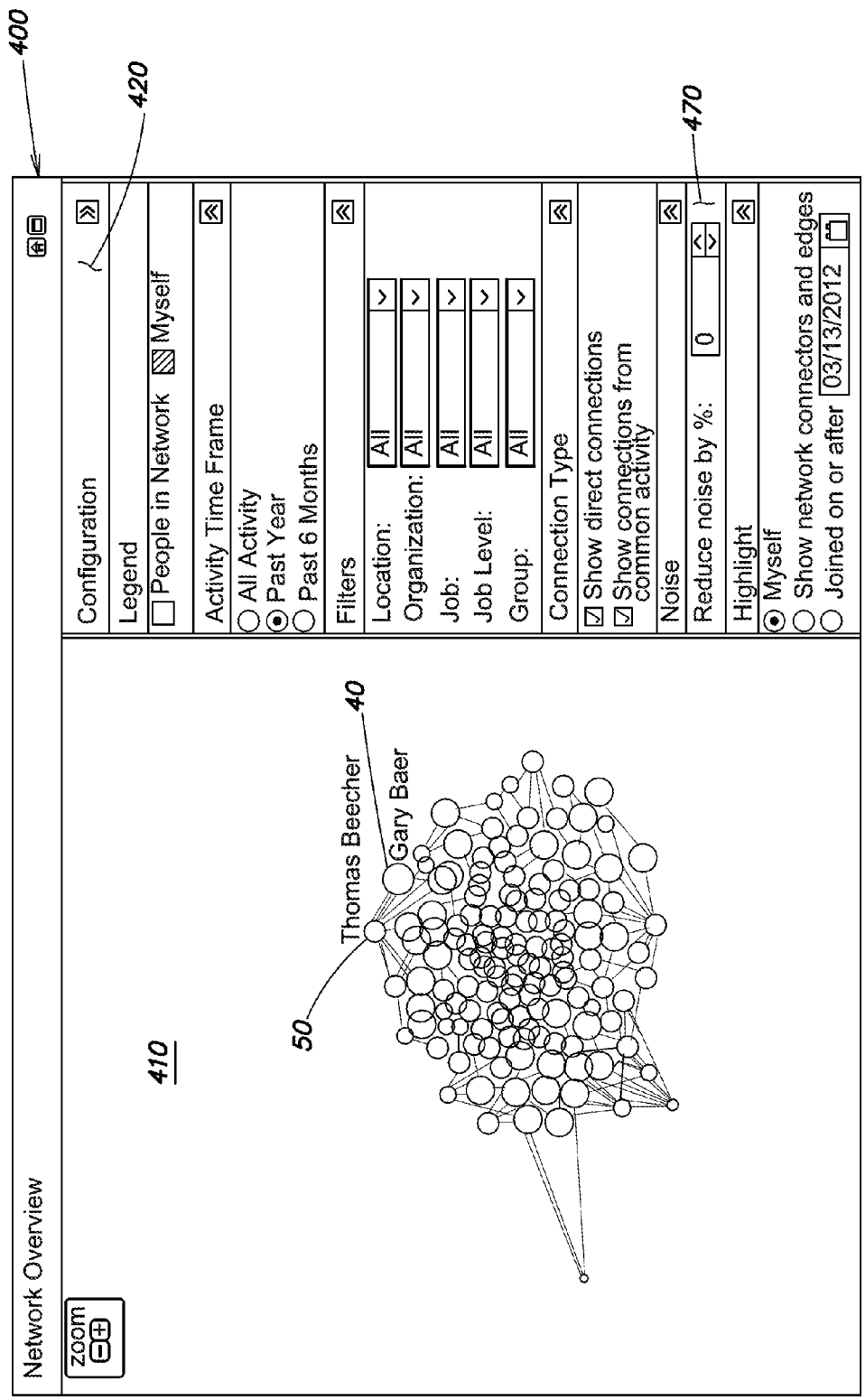
Figure 4C:
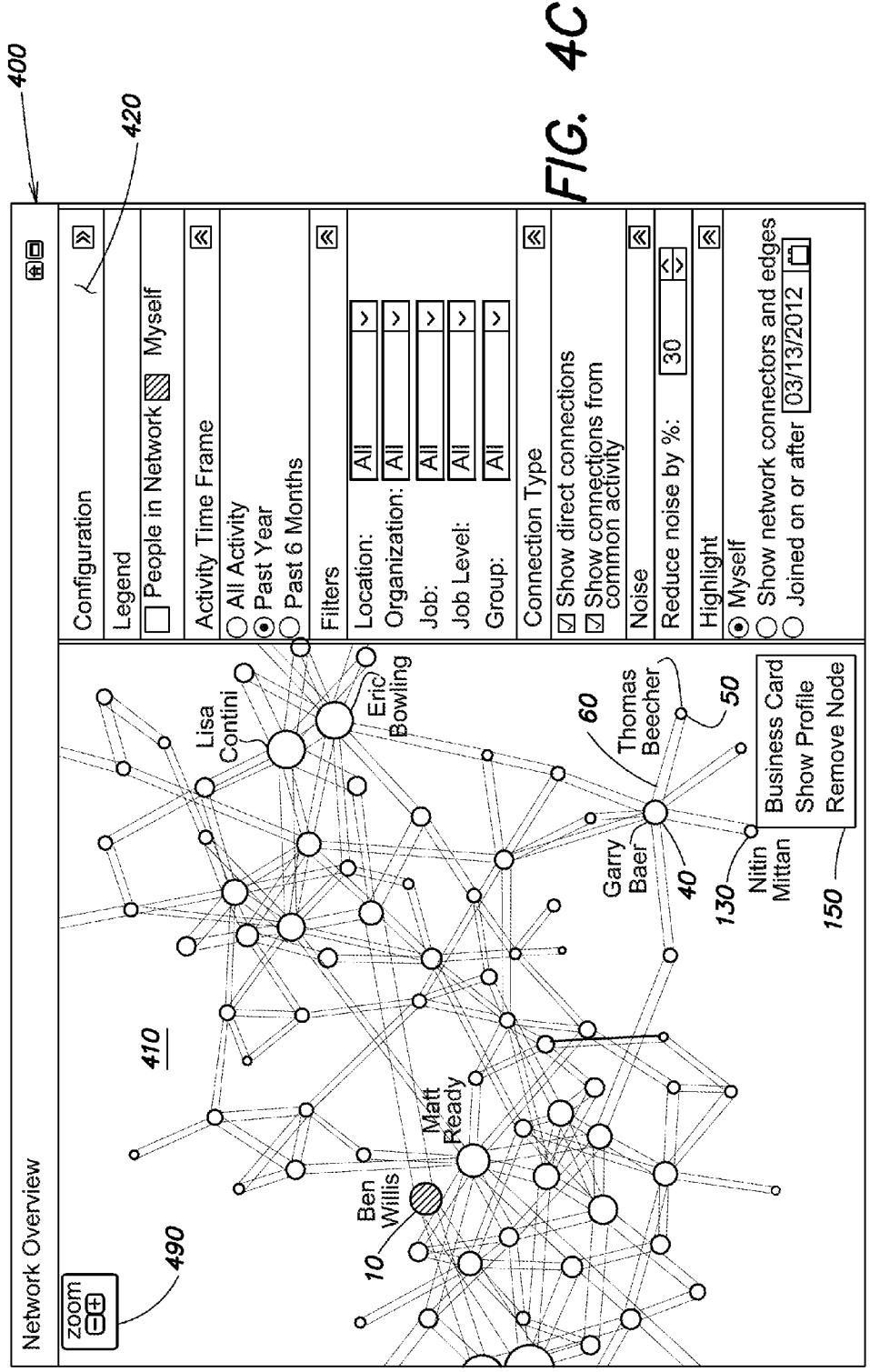
Figure 5:
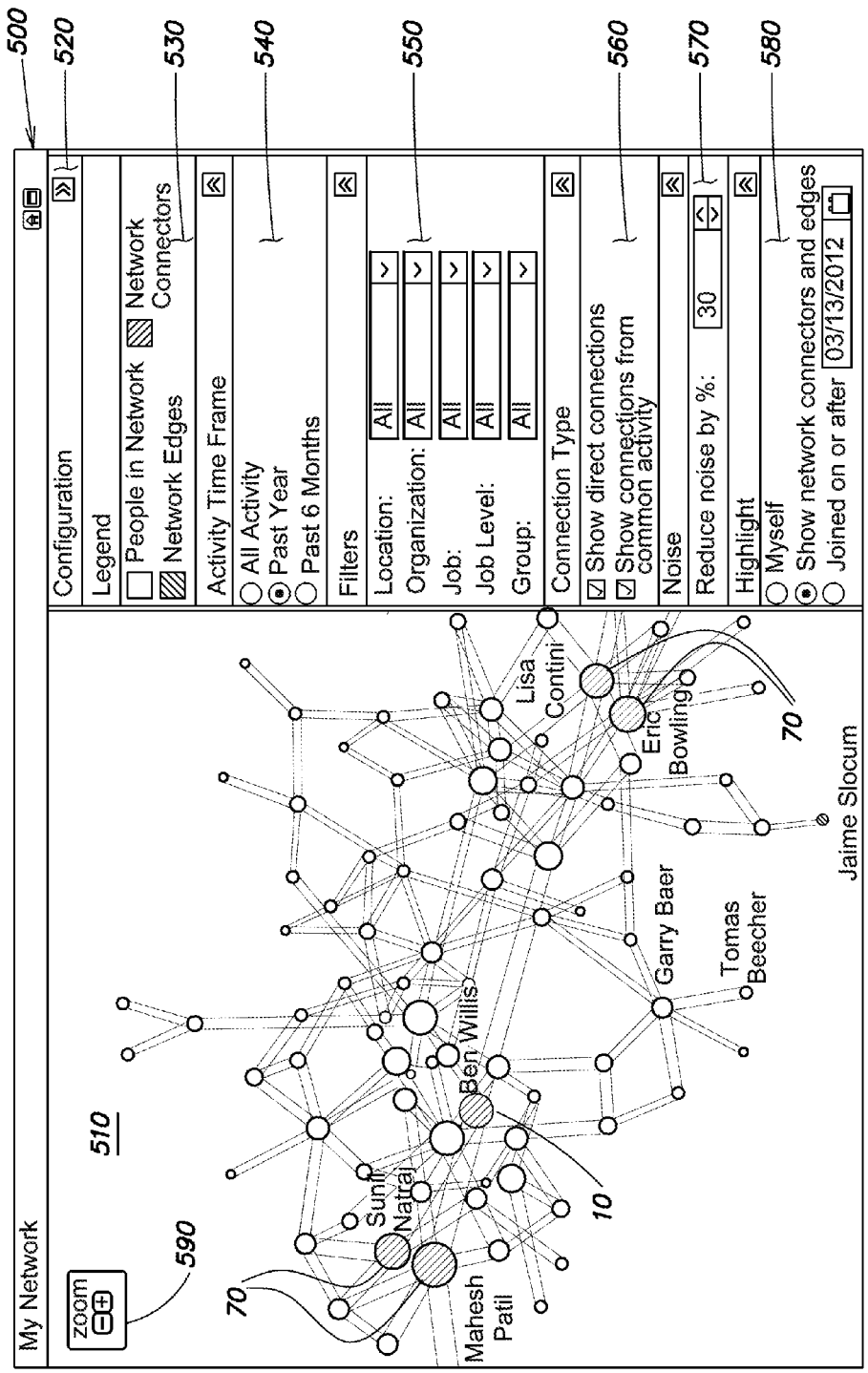
FIG. 5 illustrates an exemplary personal network visualization in accordance with some embodiments of the present invention.
Figure 6:
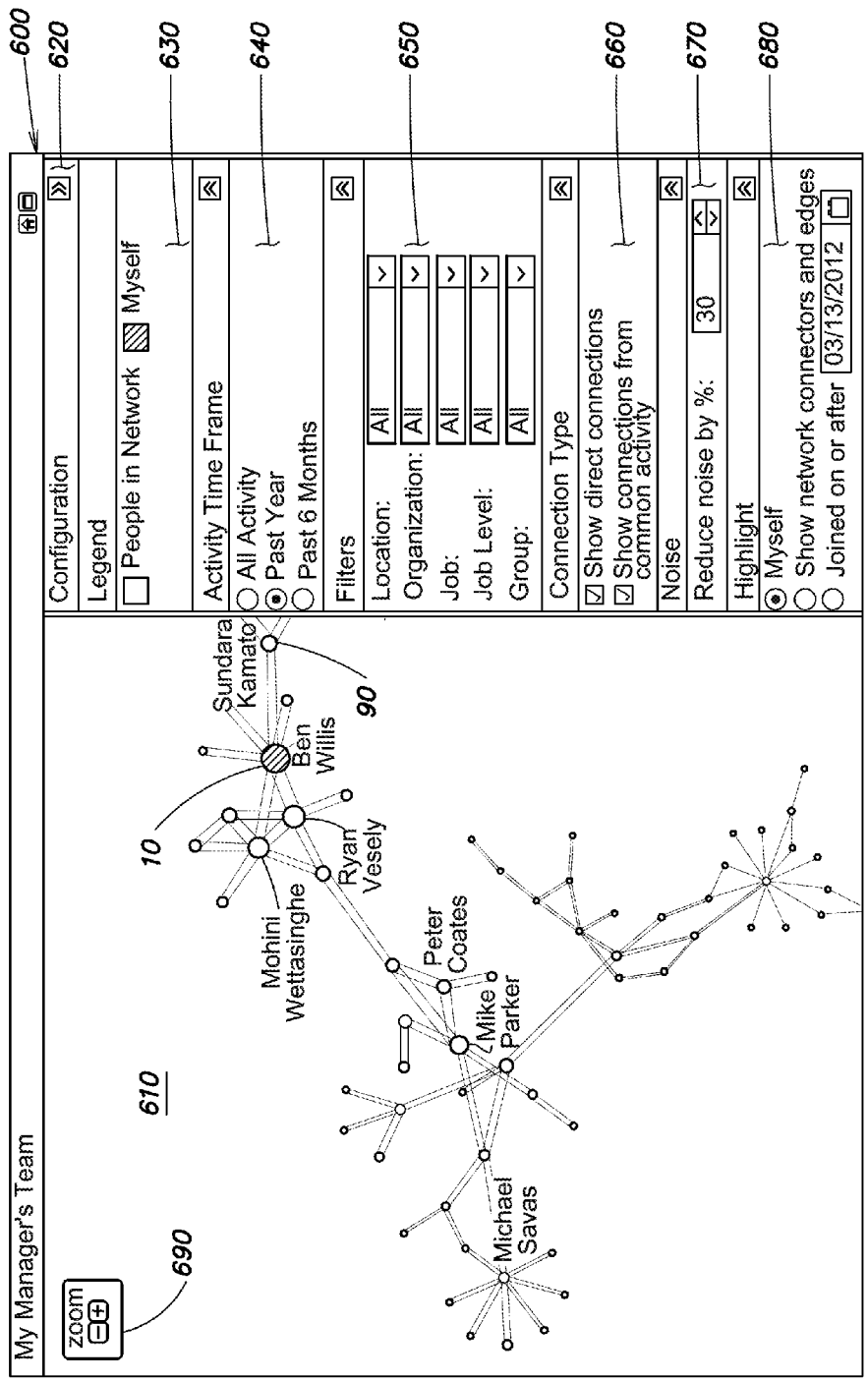
FIG. 6 illustrates an exemplary manager team network visualization in accordance with some embodiments of the present invention.
Figure 7A:
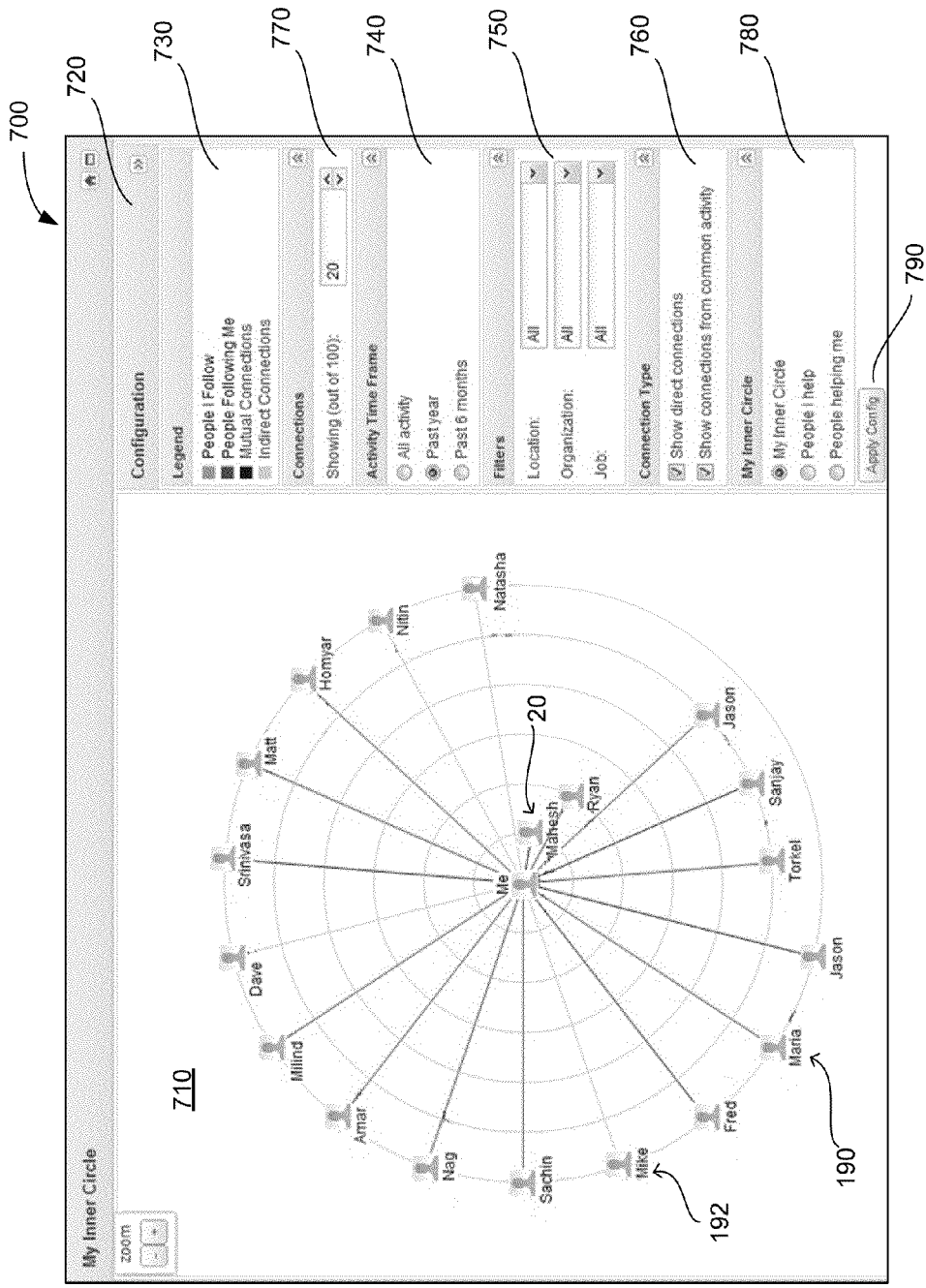
FIGS. 7A-7C illustrate an exemplary inner circle visualization in accordance with some embodiments of the present invention.
Figure 7B:
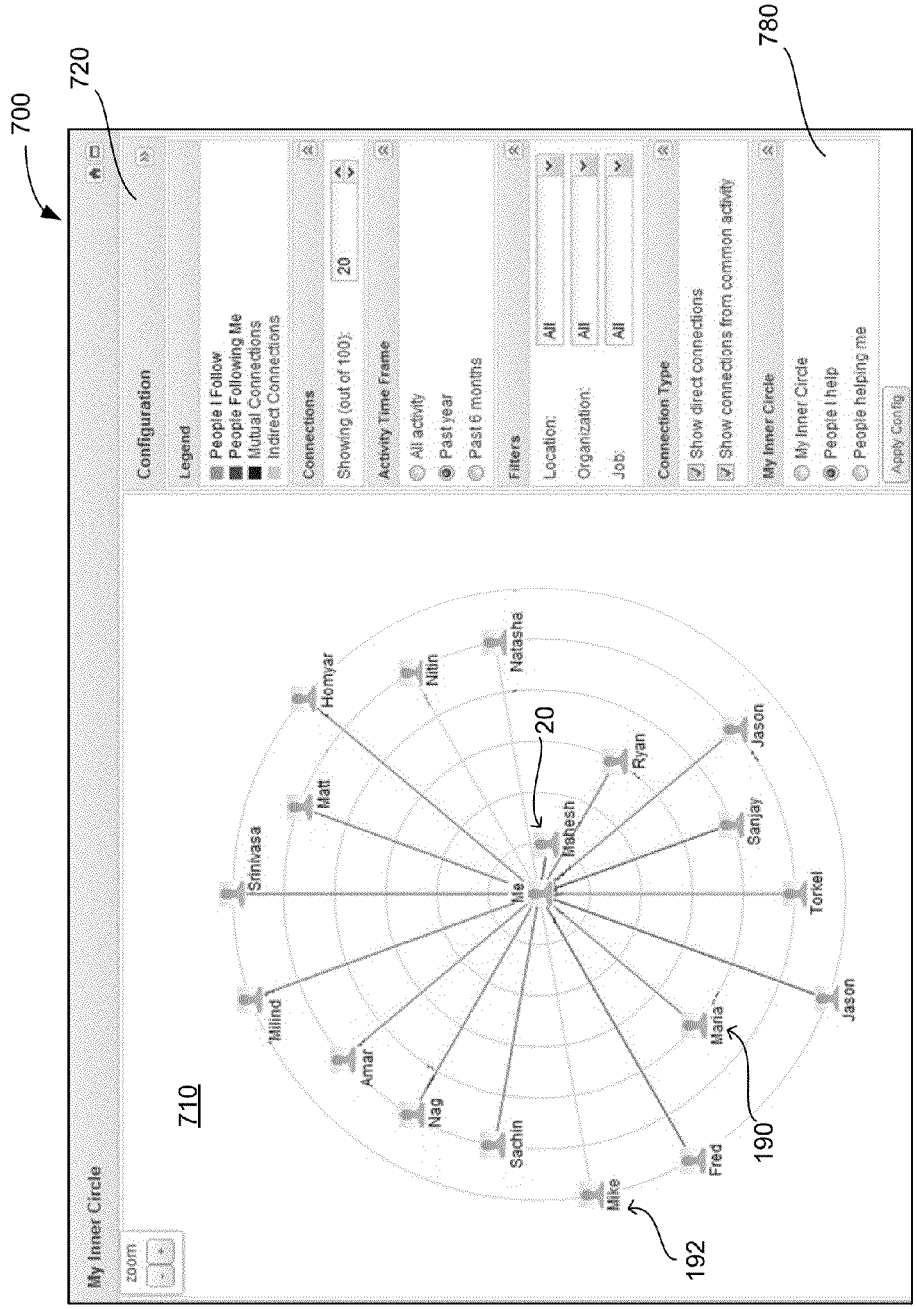
Figure 7C:
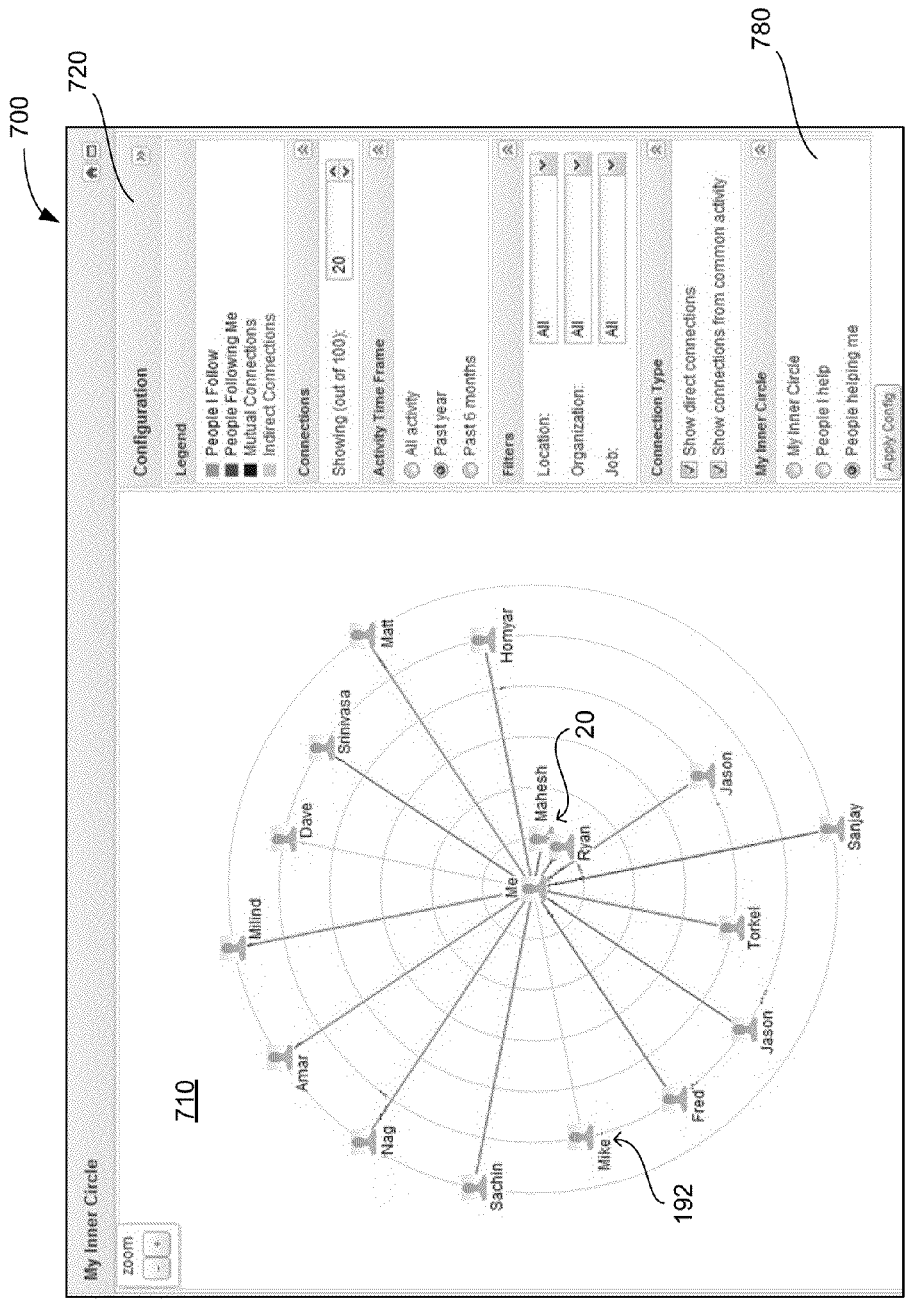
Figure 8A:
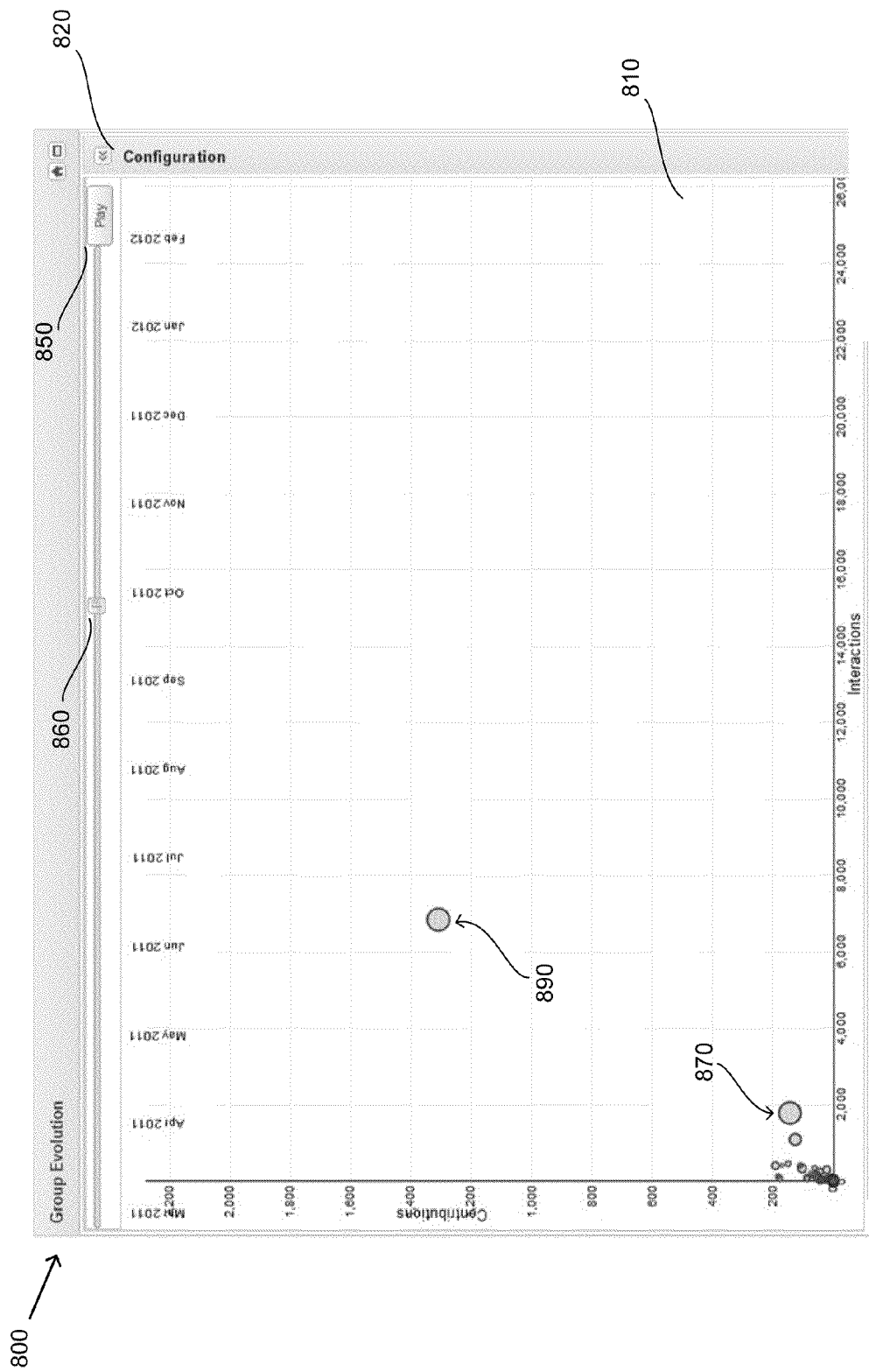
FIGS. 8A-8B illustrate an exemplary group evolution visualization in accordance with some embodiments of the present invention.
Figure 8B:
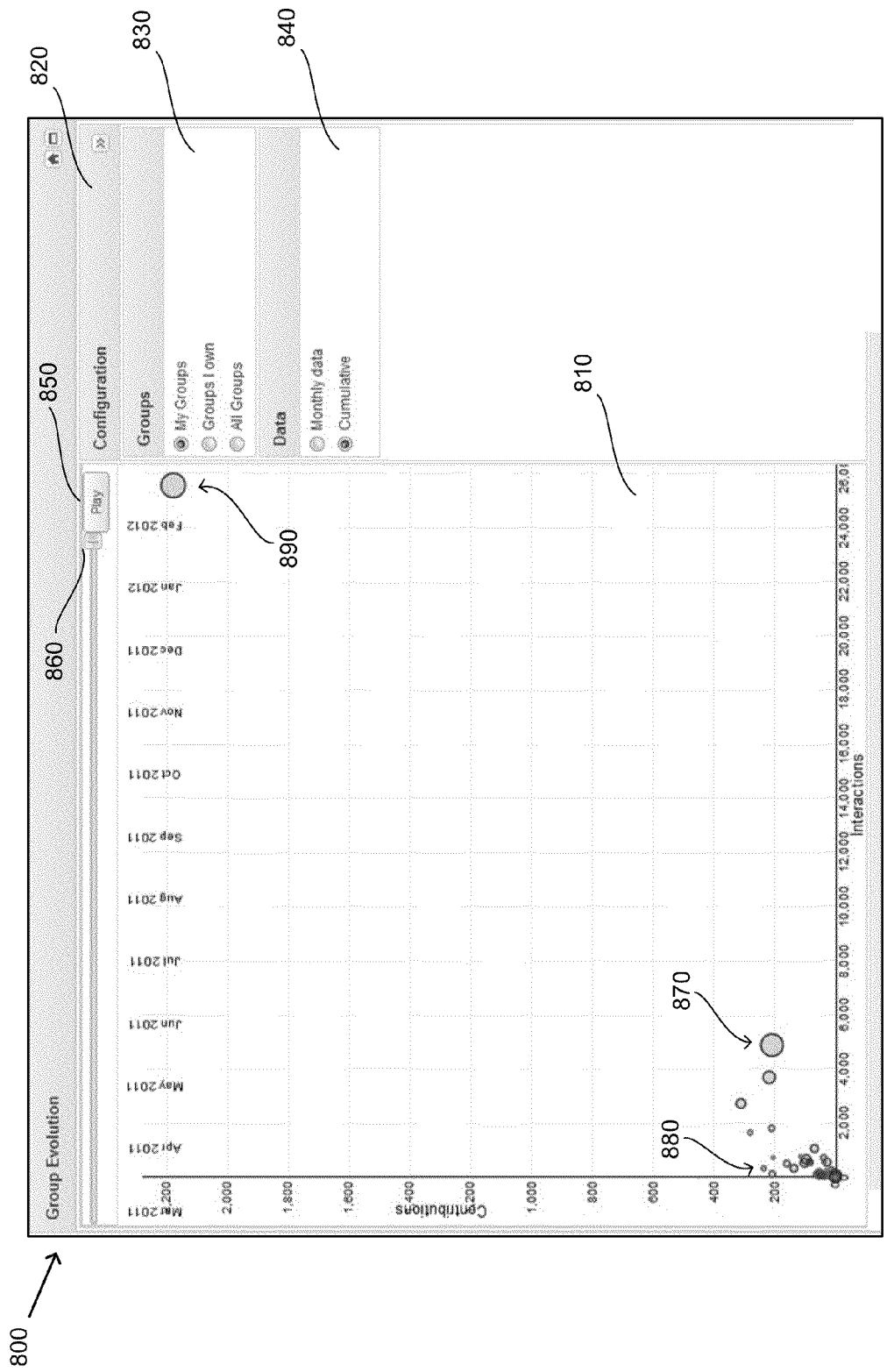

In the example of FIG. 2, six different options for network visualizations are presented, each corresponding to a different selectable button. It should be appreciated, however, that some aspects of the invention are not limited to any of these examples of visualization types, and that any suitable number and/or types of visualization options may be presented. Some embodiments are not limited to any of the particular examples of visualization types illustrated in FIG. 2, and some embodiments may provide one or more visualization options not illustrated in FIG. 2. For illustrative purposes, the example selectable visualization options presented in the menu illustrated in FIG. 2 include a button 210 for selecting a visualization of declared connections (titled "Influence Analysis" in the menu of FIG. 2), a button 220 for selecting a general network visualization (titled "Network Overview" in the menu of FIG. 2), a button 230 for selecting a personal network visualization (titled "My Network" in the menu of FIG. 2), a button 240 for selecting a manager team network visualization (titled "My Manager's Team" in the menu of FIG. 2), a button 250 for selecting an inner circle visualization (titled "My Inner Circle" in the menu of FIG. 2), and a button 260 for selecting a group evolution visualization (titled "Group Evolution" in the menu of FIG. 2). Each of these exemplary visualization types is discussed further, by way of example, below. An exemplary "Influence Analysis" visualization is illustrated in FIG. 3. An exemplary "Network Overview" visualization is illustrated in FIGS. 4A-4C. An exemplary "My Network" visualization is illustrated in FIG. 5. An exemplary "My Manager's Team" visualization is illustrated in FIG. 6. An exemplary "My Inner Circle" visualization is illustrated in FIGS. 7A-7C. An exemplary "Group Evolution" visualization is illustrated in FIGS. 8A-8B.

FIG. 3 illustrates an exemplary visualization of declared connections 300 that may be generated by network analysis component 170, e.g., in response to user selection of the "Influence Analysis" option in menu 200 via user interface 180. It should be appreciated that the illustration in FIG. 3 is merely one example, and that a visualization of declared connections may be presented in any suitable form, as aspects of the invention are not limited in this respect. For illustrative purposes, the exemplary display in FIG. 3 includes a main panel 310 for presentation of the graphical representation of the network data forming the visualization, and a configuration panel 320 for user specification of one or more parameters controlling the visualization.

In exemplary visualization of declared connections 300, the declared connections of a member of the social network (e.g., the user requesting the visualization) are analyzed and displayed graphically in main panel 310. For example, in some embodiments, network analysis component 170 may be configured to collect, and to generate a graphical representation of, the declared connections relating to a member of the social network being analyzed (e.g., declared connections may be "friends," "contacts," other members the member is "following," etc.). Exemplary visualization 300 includes a bar graph of the number of declared connections relating to the member being analyzed, as broken down into a number of categories.

In some embodiments, one or more visual distinctions may be made in the visualization to distinguish declared connection categories based on the direction of the connection. For example, the exemplary bar graph in panel 310 is color coded into two different types of declared connections: darker colored bars represent connections the current member has declared with other members of the social network (e.g., "outgoing declared connections," or "People I Follow"), and lighter colored bars represent connections that other members have declared with the current member (e.g., "incoming declared connections," or "People Following Me"). Legend panel 330 provides a reference indication of the meaning of the different colors in the bar graph. By comparing the sizes of the different colored bars, it can be observed, for example, that the number of people the current member follows is larger than the number of people that follow the current member. Mutual declared connections (e.g., another member who both follows the current member and is followed by the current member) may be handled in any suitable way. In some embodiments, mutual declared connections may be "double counted," such that an additional mutual declared connection increases the size of both the darker colored and the lighter colored bar. In other embodiments, mutual connections may be counted only once, on either the incoming side or the outgoing side. In still other embodiments, there may be a third separate category (and corresponding color coding or other visual distinction) for mutual declared connections as separate from one-directional incoming and outgoing declared connections. Parameters for configuring how the graphical representation is to be broken down based on declared connection direction may be specified in any suitable way, as aspects of the invention are not limited in this respect. In some embodiments, such parameters may be configurable by individual users, while in other embodiments, they may be configured across the network by one or more administrators (or may be fixed by default), and may not be changeable by generic members.

The exemplary display depicted in FIG. 3 also provides a dimension selection panel 340, allowing the user to specify a parameter controlling the dimension along which the visualization of declared connections is to be broken down into categories. For example, the dimension currently selected in FIG. 3 via drop-down menu is "location," causing the bar graph in main panel 310 to organize the vertical axis in terms of geographical locations of members having declared connections with the current member. This breakdown, for example, allows the user to visualize in what geographic locations he/she has the most and the fewest declared connections with other members of the social network, which may be useful in allowing the user to assess the relative strengths and/or weaknesses of different groupings within his/her network. The options for available dimensions of analysis may be fixed by default, and/or may be configurable by an administrator or the user, and any suitable set of one or more dimensions may be implemented, as aspects of the invention are not limited in this respect. Examples of suitable analysis dimensions include, but are not limited to: location, organization (e.g., consulting, sales, support, etc.), job (e.g., finance, human resources, legal, etc.), job level (e.g., manager, vice president, executive, etc.), and ad hoc groups defined by members and/or administrators on the social network. In some embodiments, available dimensions of analysis may be configured to coincide with natural segmentations of a social network, such as boundaries with a known tendency to impede collaboration between network segments on opposite sides of the boundary.

FIG. 4A illustrates an exemplary general network visualization 400 that may be generated by network analysis component 170, e.g., in response to user selection of the "Network Overview" option in menu 200 via user interface 180. It should be appreciated that the illustration in FIG. 4A is merely one example, and that a general network visualization may be presented in any suitable form, as aspects of the invention are not limited in this respect. For illustrative purposes, the exemplary display in FIG. 4A includes a main panel 410 for presentation of the graphical representation of the network data forming the visualization, and a configuration panel 420 for user specification of one or more parameters controlling the visualization.

In exemplary general network visualization 400, the monitored activity of members of the social network (e.g., the entire social network, or a specified portion of the social network) are analyzed and displayed graphically in main panel 410. For example, in some embodiments, network analysis component 170 may be configured to utilize monitored activity data to generate a graphical representation of the social network or portion(s) thereof, including one or more indications of the monitored activity used in the analysis. Exemplary visualization 400 includes a network graph representing each member of the social network as a node (e.g., a circle, dot, or other visual representation of a network node), and representing activity connecting pairs of members as connectors (e.g., lines or other visual representations of network connections). In some embodiments, the graphical representation may be filtered to show only a certain number of nodes, such as the top N members with the most monitored activity on the social network.

In some embodiments, one or more components of networking system 100 (such as social network component 140 and/or network analysis component 170) may be configured to use monitored activity on the social network to determine measures of influence between nodes (e.g., members) of the social network. This may be done in any suitable way. In one example, a point system may be established such that certain actions add points to a measure of a member's influence on another member in the social network. For example, in some embodiments, a measure of a member A's influence on a member B may be increased by one point when member B declares a connection with member A (e.g., when member B "follows" member A), or when member A declares a connection with member B. In some embodiments, a point may be added to the measure of member A's influence on member B when member A shares an object with member B on the social network, or when member B shares an object with member A on the social network. As discussed above, objects may include free text, posts to blogs, discussion topics, links to electronic files, links to webpages, event postings, and/or any other item of information suitable for posting to a social network. In some embodiments, a point may be added to the measure of member A's influence on member B when member B views or performs another action on an object contributed by member A to the social network, or when member A views or performs another action on an object contributed by member B to the social network. As discussed above, such actions may include viewing the object, sharing the object, rating the object, ranking the object, bookmarking the object, commenting on the object, and/or any other suitable action. In some embodiments, one or more thresholds may be set (e.g., by an administrator, or by default), such that actions related to objects that are viewed and/or otherwise consumed by more than a threshold number of members in the social network are not counted as points toward influence measures. In some embodiments, a point may be added to the measure of member A's influence on member B when member B provides an impression on member A or performs another action on member A on the social network, or when member A provides an impression on member B or performs another action on member B on the social network. As discussed above, such actions performed on a member A may include viewing member A's profile, sharing member A's profile, rating member A, ranking member A, bookmarking member A's profile, posting a comment or other object on member A's profile, providing an impression on member A, and/or any other suitable action. Providing an impression on member A may include posting to the social network a comment about a quality of member A and/or about something member A did. In some embodiments, points for actions such as the foregoing may be aggregated (e.g., summed, or otherwise combined) to determine the measure of member A's influence on member B within the social network. However, it should be appreciated that the foregoing are merely examples, and some embodiments are not limited to any particular technique(s) for determining measures of influence. Other examples of actions suitable for consideration are also possible. Also, aspects of the invention are not limited to a points system for determining measures of influence, or to equal points for different monitored actions, and any other suitable system of implementation may be used.

In some embodiments, network analysis component 170 may be configured to generate the graphical representation of the social network or portion(s) thereof such that nodes in the graphical representation have one or more visual characteristics indicative of the corresponding members' measures of influence on others in the social network. For example, in some embodiments, the size of a node (e.g., the radius of a circle representing a node, or any other suitable measure) may be directly proportional to or otherwise determined by a combination of the corresponding member's measures of influence on all other members in the social network. For example, in exemplary network visualization 400, the node labeled 20 is larger than the node labeled 10, indicating that the member corresponding to node 20 has a greater combined measure of influence on other members of the social network than the member corresponding to node 10 does. However, both nodes 10 and 20 are among the larger nodes depicted in the network graph, indicating that their members' measures of influence are relatively high within the social network. Nodes 40 and 50, for example, are smaller, indicating that their members have relatively lower measures of influence within the social network. In some embodiments, such visual indicators in the network graph may make it simple for a user to observe, in a single visualization, which members provide the most strength to the network in terms of fostering collaboration through actual interactions.

In some embodiments, network analysis component 170 may be configured to generate the graphical representation of the social network or portion(s) thereof such that connectors between nodes in the graphical representation have one or more visual characteristics indicative of the strength of the connection (e.g., the interactions) between the corresponding members of the social network. For example, in some embodiments, the thickness of a connector (e.g., a line or other visual connector) between a node A and a node B may be directly proportional to or otherwise determined by a combined measure of member A's influence on member B and member B's influence on member A (or alternatively, a one-way measure of influence focusing only on member A's influence on member B, or on member B's influence on member A). Alternatively or additionally, in some embodiments the length of a connector between node A and node B may be inversely proportional to or otherwise determined by the same combined measure of influence, representing the strength of the connection between nodes A and B. Equivalently, the proximity between nodes A and B in the network graph may be directly proportional to or otherwise determined by the combined measure of influence (e.g., the connection strength) between nodes A and B. For example, in exemplary network visualization 400, the connector between nodes 10 and 20 is relatively thick, indicating that the combined measure of influence between the two corresponding members is high. By contrast, the connector between nodes 40 and 50 is relatively thinner, indicating that the combined measure of influence between those two members is lower.

Any suitable technique(s) may be utilized by network analysis component 170 to determine a graph layout for all nodes in the network analysis such that the appropriate information is conveyed by visual characteristics such as sizes of nodes and connectors, proximity between nodes, etc. In some embodiments, any of various known software modules for producing optimized graphs given specified input parameters may be used. For instance, examples of open source code for optimizing graph layout include Infovis and Protovis.

In some embodiments, user interface 180 may be configured to present to the user any of various options for specifying parameters or other configuration requests for network analyses. For example, the exemplary display in FIG. 4A includes a number of input and information panels within configuration panel 420. It should be appreciated that these are provided by way of example, and that some embodiments are not limited to any particular configuration parameters or to any particular implementation of a user interface allowing user input of such parameters.

Exemplary configuration panel 420 includes legend panel 430, which provides information explaining the meaning of color coding, highlighting, and/or other visual distinctions presented in the network graph currently displayed in main panel 410. In the example depicted in FIG. 4A, the configuration is currently set to highlight "myself" in the network graph, such that the node representing the current member in the network graph is visually distinguished from other nodes. In this case, node 10 represents the current member (e.g., the user requesting the network analysis), and is displayed in a different color from the other nodes in the network. Other parameters for visually distinguishing certain nodes and/or portions of the social network may alternatively or additionally be used, examples of which are discussed below.

Exemplary configuration panel 420 also includes activity time frame panel 440, which allows the user to specify the time frame from which activity monitored on the social network should be included in the network analysis. Any suitable time frame(s) may be used, as aspects of the invention are not limited in this respect. In exemplary activity time frame panel 440, options are provided to consider all activity that has been monitored on the social network, activity from only the past year, or activity from only the past six months. In exemplary visualization 400, the option for activity from the past year has been selected by the user (or set by default), such that the activity indicated in the network graph in main panel 410 (e.g., the sizes of the nodes and connectors, and the layout of the graph as determined by the calculated proximities between nodes) is only that which occurred during the year-long period preceding the user's current request for the network analysis.

Exemplary configuration panel 420 also includes filter panel 450, which provides options for a number of filters that the user may select to be applied to the network analysis. Any suitable set of filters may used, and some embodiments are not limited to any particular set of filters for network analysis. By way of example, filter panel 450 provides options for a location filter, an organization filter, a job filter, a job level filter, and a group filter. For example, if the user were to apply the location filter to filter out a particular geographical location, for example Europe, the network graph in main panel 410 may be re-generated with nodes representing members located in Europe omitted. In some embodiments, such filters may be useful for breaking down and analyzing the strengths and weaknesses of the social network, especially in a professional community setting. For example, if the European set of members were particularly important in facilitating collaboration within the larger social network of the professional community, a user could request a network visualization with the Europe location filtered out, to see how the network would be affected by the hypothetical removal of the European team. If it seems that collaboration would substantially break down across the network as a whole, measures could be taken to attempt to improve collaboration between and among other portions of the network to ameliorate the determined weakness, perhaps by introducing people who were not previously interacting. In another example, a user could apply a filter to remove all nodes other than a particular group of members from the network graph in main panel 410. In some embodiments, this may be useful for visualizing the collaboration occurring within a particular portion of the social network, such as a group formed for a particular purpose such as a professional project. If the group is not performing according to its goals, decisions may be made to take action to improve collaboration and/or activity, or perhaps to disband the group as nonfunctional.

Exemplary configuration panel 420 also includes connection type panel 460, which allows the user to specify the type of connections between nodes to be included in the network graph in main panel 410. For example, in some embodiments, network analyses may be provided that exclude connectors between nodes whose members have declared connections with each other (e.g., members who are following each other). For instance, if the user were to un-check the box next to "Show direct connections" in panel 460, network analysis component 170 may be configured in some embodiments to re-generate a graphical representation of the social network or portion(s) thereof, without drawing a connector between any two nodes A and B if member A had declared a connection with member B, if member B had declared a connection with member A, and/or if members A and B had mutually declared connections with each other. In some embodiments, with declared connections removed, the resulting network analysis may reflect connections referred to herein as "indirect connections" or "connections from common activity," which may include any actions, other than declaring and undeclaring connections, that contribute to measures of influence between pairs of nodes. Examples of such actions are discussed above. In some embodiments, the option to exclude declared connections from a network visualization may provide the benefit of allowing users to appreciate connections they may have with other users whose value as collaborative resources they did not previously appreciate. Alternatively or additionally, in some embodiments an option may be provided to exclude indirect connections and to analyze only declared connections, e.g., in a way that still provides indications of actual monitored interactions between members having declared connections, as discussed above.

Exemplary configuration panel 420 also includes noise panel 470, which allows the user to input a request to reduce visual complexity of the graphical representation of the social network or portion(s) thereof, by specifying a level of noise reduction desired to be implemented. In some embodiments, network analysis component 170 may be configured to alter the graphical representation of the social network or portion(s) thereof, in response to a user request to reduce its visual complexity, in such a way as to decrease the proximities between nodes in the network graph. For example, FIG. 4B illustrates the exemplary network visualization 400 of FIG. 4A with the level of noise reduction set to 0% in panel 470 (e.g., with no alteration to reduce visual complexity of the graphical representation). As can be seen in FIG. 4B, the network graph generated using raw influence measures creates the visual impression of a three-dimensional ball or globe formed of a mass of nodes that are very difficult to visually differentiate, and connectors between nodes are virtually impossible to see. In some embodiments, network analysis component 170 may be configured to alter the graphical representation to give the network graph more of a flattened two-dimensional appearance, as opposed to the appearance of the three-dimensional ball. In some embodiments, such alteration may involve changing the angular positions of some nodes relative to other nodes in the graphical representation. For example, in the representation without noise reduction in FIG. 4B, nodes 40 and 50 appear with node 50 being substantially to the left of node 40. On the other hand, the example in FIG. 4A shows the graph of the same network with the level of noise reduction set to 30%. Here, node 50 appears substantially to the right of node 40; the angular position of node 50 has changed relative to node 40, in addition to the proximity between the two nodes in the graphical representation being decreased. Such alteration of the graphical representation of the social network or portion(s) thereof to reduce visual complexity may be performed in any suitable way, as aspects of the invention are not limited in this respect. In one example, a noise reduction level of 30% may involve network analysis component 170 decreasing all raw influence measures by 30% (or by another suitably determined amount). In some embodiments, this may cause the connection strengths between nodes to decrease, resulting in decreased proximity (i.e., increased distance) between nodes. A reduction in size of individual nodes may also result, in some embodiments. Further, in some embodiments, as the network graph layout is recomputed with the decreased influence measures as inputs, the angular positions of some nodes relative to other nodes may be changed, resulting in a flattening out of the previously ball-like network graph. However, this is merely an example, and it should be appreciated that any suitable technique for reducing visual complexity may be used, as aspects of the invention are not limited in this respect.

Exemplary configuration panel 420 also includes highlight panel 480, which allows the user to specify particular nodes and/or types of nodes to be visually distinguished from other nodes in the network graph displayed in main panel 410. Any suitable set of options for visually distinguishing nodes may be employed, and some embodiments are not limited to any particular set of such options. Although particular examples are provided in FIG. 4A, other examples are possible. For illustrative purposes, the examples depicted in FIG. 4A include an option to highlight "myself," an option to highlight "network connectors and edges," and an option to highlight members who "joined on or after" a specified date. The "myself" option, as discussed above, in some embodiments may cause the node representing the current member (e.g., the user requesting the network analysis) to be visually distinguished in the network graph. The "network connectors and edges" option in some embodiments may cause nodes having influence measures above a specified threshold (e.g., the collaborative "hubs" of the social network), and/or nodes having influence measures below a specified threshold (e.g., the "fringes" of the social network), to be visually distinguished from other nodes whose influence measures lie in between the two specified thresholds. Such thresholds may be specified in any suitable way, such as by being set by default, by being configured for the entire network by an administrator, by being individually configurable by users, or in any other suitable way. The "joined on or after" option in some embodiments may cause nodes representing members who joined the social network (and/or who joined a professional community corresponding to the social network) on or after the date input by the user into panel 480 to be visually distinguished from other nodes in the network graph. In some embodiments, this may provide the benefit of allowing, e.g., a member of a professional community to see how new hires are adjusting to the collaborative environment of the professional community. If the newer members appear to have developed little influence within the social network, improvements to on-boarding initiatives such as training, mentoring, and introductions to more senior members may perhaps be warranted.

The exemplary display of FIG. 4A also includes zoom buttons 490, which may allow the user to zoom in and out on the network graph displayed in main panel 410. FIG. 4C depicts the exemplary network visualization 400 when the option to zoom in has been selected via button 490. As illustrated in FIG. 4C, in some embodiments, further user selectable options may be provided in response to user selection of a particular node in the network graph, such as by clicking on the node with a mouse, or by any other suitable form of user input. The example in FIG. 4C depicts a context menu 150 displayed in response to user selection of node 130. Menu 150 presents a number of available options for interaction with the selected node, including viewing the corresponding member's business card, viewing the corresponding member's profile, and removing the selected node from the network analysis. It should be appreciated that the set of options presented in menu 150 is provided by way of example only, and aspects of the invention are not limited to any particular set of options for interaction with individual nodes in a network analysis. Additional interaction options may also be implemented. In some embodiments, user selection of an option to remove a node from the network analysis may result in network analysis component 170 recomputing the graphical representation of the social network or portion(s) thereof, as if the corresponding member were not a member of the social network. For example, any actions involving the member who is removed from the analysis, whether the actions contribute to influence measures for that member or for other members, may be excluded from the determinations of influence measures, and the network graph may be recomputed. In some embodiments, this type of hypothetical analysis may be useful in identifying potential future trouble spots for the social network. For example, in a professional community, if hypothetically removing a certain node from the network results in significant break-down of collaborative connections, it may be prudent to invest in retaining that member or in preparing a succession plan in case the member eventually leaves the professional community.

FIG. 5 illustrates an exemplary personal network visualization 500 that may be generated by network analysis component 170, e.g., in response to user selection of the "My Network" option in menu 200 via user interface 180. It should be appreciated that the illustration in FIG. 5 is merely one example, and that a personal network visualization may be presented in any suitable form, as aspects of the invention are not limited in this respect. For illustrative purposes, the exemplary display in FIG. 5 includes a main panel 510 for presentation of the graphical representation of the network data forming the visualization, and a configuration panel 520 for user specification of one or more parameters controlling the visualization. The network analysis graph displayed in main panel 510 for personal network visualization 500 is similar to that in general network visualization 400, except that personal network visualization 500 only includes nodes corresponding to members having some connection (e.g., declared and/or indirect connections) with the current member represented by node 10.

Exemplary configuration panel 520 includes legend panel 530, activity time frame panel 540, filter panel 550, connection type panel 560, noise panel 570, and highlight panel 580, each of which functions similarly to the corresponding panel in exemplary configuration panel 420, discussed above. For example, in exemplary highlight panel 580, the user has selected the option to highlight "network connectors and edges," resulting in nodes representing network "hubs" and "fringes" being visually distinguished in the network graph in main panel 510, as discussed above. For instance, nodes 70 are highlighted as hubs, since their members' influence measures are above the specified threshold for identifying those members as hubs. Node 80 may be a candidate for being identified as a network fringe, since its size (representing the influence measure of the member it represents) is among the smallest in the network graph. In some embodiments, identifying nodes on the fringes of the social network may be useful for identifying members who are disengaging and may be at risk for leaving the community, for whom retention and/or succession planning measures may be warranted.

The exemplary display in FIG. 5 also includes zoom buttons 590, which function similarly to zoom buttons 490. In addition, in some embodiments, further options may also be available in the personal network visualization upon user selection of a particular node in the network graph, as discussed above with reference to FIG. 4C.

FIG. 6 illustrates an exemplary manager team network visualization 600 that may be generated by network analysis component 170, e.g., in response to user selection of the "My Manager's Team" option in menu 200 via user interface 180. It should be appreciated that the illustration in FIG. 6 is merely one example, and that a manager team network visualization may be presented in any suitable form, as aspects of the invention are not limited in this respect. For illustrative purposes, the exemplary display in FIG. 6 includes a main panel 610 for presentation of the graphical representation of the network data forming the visualization, and a configuration panel 620 for user specification of one or more parameters controlling the visualization. The network analysis graph displayed in main panel 610 for manager team network visualization 600 is similar to that in general network visualization 400, except that manager team network visualization 600 only includes nodes corresponding to the current member's manager team in a professional community. For example, node 10 in manager team network visualization 600 represents the current member (e.g., the user requesting the network analysis), node 90 represents the current member's manager, and the other nodes in the network graph represent the other members of the manager's (node 90's) team. As illustrated in FIG. 6, in some embodiments, members' names may only be displayed by their corresponding nodes in the network graph if the nodes are above a specified threshold size (e.g., if the members' measures of influence are above a specified threshold), which threshold may be specified in any suitable way, including by default, by administrator, and/or by individual user configuration. In some embodiments, such thresholding of the display of members' names may also be applied to other network visualizations such as general network visualizations and personal network visualizations. However, thresholding of name display is not required, and aspects of the invention are not limited to any particular criteria for displaying or not displaying members' names. In some embodiments, members names may not be displayed at all, or may be made available only upon user selection of particular nodes, etc.

FIG. 6 also provides an illustration of a common situation, as discussed above, in which the current member's most significant collaborations may actually occur with people who are not part of the current member's manager team, e.g., on a formal org chart. For instance, node 20 in FIG. 4A represents a member with which the current member (node 10) interacts significantly (as can be seen by the thickness of the connector between nodes 10 and 20 in FIG. 4A), but node 20 does not appear at all in manager team network visualization 600 because node 20 is not a member of node 10's manager team.

Exemplary configuration panel 620 includes legend panel 630, activity time frame panel 640, filter panel 650, connection type panel 660, noise panel 670, and highlight panel 680, each of which functions similarly to the corresponding panel in exemplary configuration panels 420 and 520, discussed above. The exemplary display in FIG. 6 also includes zoom buttons 690, which function similarly to zoom buttons 490 and 590. In addition, in some embodiments, further options may also be available in the manager team network visualization upon user selection of a particular node in the network graph, as discussed above with reference to FIG. 4C.

FIG. 7A illustrates an exemplary inner circle visualization 700 that may be generated by network analysis component 170, e.g., in response to user selection of the "My Inner Circle" option in menu 200 via user interface 180. It should be appreciated that the illustration in FIG. 7A is merely one example, and that an inner circle visualization may be presented in any suitable form, as aspects of the invention are not limited in this respect. For illustrative purposes, the exemplary display in FIG. 7A includes a main panel 710 for presentation of the graphical representation of the network data forming the visualization, and a configuration panel 720 for user specification of one or more parameters controlling the visualization. In main panel 710 is presented a graphical representation of the portion of the social network formed by the current member (e.g., the user requesting the network analysis) and a specified number of other members of the social network having the most interactions with the current member (e.g., other members who influence the current member the most, other members whom the current member influences the most, and/or other members for whom the combined measure of influence with the current member is the highest). Connections panel 770 within configuration panel 720 allows the user to specify the number of other members to be displayed in main panel 710.

In exemplary inner circle visualization 700, a node with a photo of the current member is placed at the center of a circle, and nodes with photos of the other displayed members are positioned around the current member's node in the circle. Although the example depicted in FIG. 7A includes photographs with each member's node, this is merely an example and is not required. In this example, the radial proximity of each node to the current member's node is based on a measure of influence between the two members. This may be the measure of the current member's influence on the other member, the measure of the other member's influence on the current member, the combination of both measures, or any other suitable measure of influence.

Exemplary configuration panel 720 includes legend panel 730, activity time frame panel 740, filter panel 750, and connection type panel 760, each of which functions similarly to the corresponding panel in exemplary configuration panels 420, 520 and 620, discussed above. For example, legend panel 730 displays information explaining the meaning of color coding and/or other visual distinctions used in the graphical representation displayed in main panel 710. In this example, the current member's outgoing declared connections ("People I Follow"), incoming declared connections ("People Following Me"), mutual declared connections, and indirect connections are visually distinguished from each other by color coding the lines connecting the nodes in the graphical representation to the center node. For instance, node 20 is a mutual declared connection (Mahesh follows the current member, and the current member follows Mahesh), node 190 is an incoming declared connection (Maria follows the current member, but the current member does not follow Maria), and node 192 is an indirect connection (Mike and the current member do not follow each other, but they do influence each other). Exemplary configuration panel 720 further includes "apply" button 790, which the user may select after entering configuration parameters in other panels of configuration panel 720, to cause network analysis component 170 to re-generate the graphical representation in accordance with the new parameters. This may be applied similarly to any other visualization described herein. However, this is not required in any visualization, and aspects of the invention are not limited in this respect.

Exemplary configuration panel 720 also includes panel 780, which allows the user to select different parameters for the determination of the proximity of nodes in the circle to the center node. In the example depicted in FIG. 7A, the default parameter is selected, such that each node's proximity to the center node is determined based on the combined measure of influence of that member on the current member and the current member on that member. FIG. 7B illustrates the same visualization with the "People I help" parameter selected, such that each node's proximity to the center node is determined based only on the measure of the current member's influence on that member. With this parameter selected, node 190 has moved closer to the center of the circle, indicating that Maria may be influenced by the current member more than the current member is influenced by Maria. FIG. 7C illustrates the visualization with the "People helping me" parameter selected, such that each node's proximity to the center node is determined based only on the measure of that member's influence on the current member. With this parameter selected, node 190 is no longer among the current member's top 20 connections, while node 192 has moved closer to the center of the circle.

In some embodiments, further options may also be available in the inner circle visualization upon user selection of a particular node in the inner circle graph, including any of the options discussed above with reference to FIG. 4C. In some embodiments, user selection of a particular node in the inner circle graph may cause the graph to be re-centered on the selected node, the member represented by the selected node to become the current member, and that member's inner circle of top connections to be displayed.

FIG. 8A illustrates an exemplary group evolution visualization 800 that may be generated by network analysis component 170, e.g., in response to user selection of the "Group Evolution" option in menu 200 via user interface 180. It should be appreciated that the illustration in FIG. 8A is merely one example, and that a group evolution visualization may be presented in any suitable form, as aspects of the invention are not limited in this respect. For illustrative purposes, the exemplary display in FIG. 8A includes a main panel 810 for presentation of the graphical representation of the network data forming the visualization, and a configuration panel 820 for user specification of one or more parameters controlling the visualization.

Exemplary main panel 810 is configured as a Cartesian plot with "interactions" on the horizontal axis and "contributions" on the vertical axis. Plotted on the graph are a number of nodes, each node representing a defined group of members within the social network. Such groups may be defined in any suitable way, including as ad hoc user-created groups, as aspects of the invention are not limited in this respect. In exemplary group evolution visualization 800, the size of each node is representative of the size of the corresponding group (e.g., the number of members in the group); however, this is just an example, and is not required. The exemplary display depicted in FIG. 8A also includes a third temporal axis with a scrolling bar 860. In some embodiments, network analysis component 170 may be configured to generate a graphical representation of group evolution as a moving image representing the evolution of multiple groups over time. At the beginning of the time sequence (e.g., March 2011 in the example of FIG. 8A), all of the nodes representing all of the groups may begin at the origin of the graph (e.g., with zero interactions and zero contributions). Upon user selection of "play" button 850 (or upon any other suitable user input to begin group evolution playback), scrolling bar 860 may begin to move from left to right, and the plurality of nodes representing the plurality of groups may begin to move upward and to the right from the origin in the lower left corner of the graph. In some embodiments, the size of the nodes (e.g., representing the size of the groups) may change during the playback in accordance with how the group membership changed during the time under study.

In some embodiments, at any given time slice indicated by the current position of scroll bar 860, each node representing an individual group may be plotted on the graph at the number of interactions and contributions (or any other suitable activity measure) that were performed by members of that group from the beginning of the time sequence to the current time index. As such, in some embodiments, the positioning of the plurality of nodes at a given time index may provide an indication of the comparative levels of activity of the groups represented by the nodes. In the example depicted in FIG. 8A, playback has progressed up to a time index near October 2011. Node 890 has moved upward and to the right from the origin more than node 870 has, indicating that the group represented by node 890 has been more active than the group represented by node 870. FIG. 8B illustrates the end of the playback at time index February 2012. Node 890 has moved all the way to the upper right corner of the graph, while node 870 has moved some further distance to the right but not much more upward.

In the example of FIGS. 8A-8B, "contributions" represent objects that were contributed to the social network by members of a group, and "interactions" represent actions that were performed on such objects by members of a group. In some embodiments, the most valuable groups to a social network may be those that end up in the upper right corner of the graph, with large numbers of both contributions and interactions, such as the group represented by node 890. In some embodiments, groups with more interactions than contributions, such as the group represented by node 870, may be identified as collaborators, while groups with more contributions than interactions, such as the group represented by node 880, may be identified more as file repositories or file sharers. In some embodiments, the ability to compare multiple groups in terms of such measures may be useful in helping to identify targeted ways to make a social network (such as, e.g., a professional community) more successful. For example, if a group is identified as very successful in the upper right corner of the graph, the member(s) in charge of that group could be identified and leveraged for other productive work within the community. Groups that are unbalanced toward the upper left or lower right of the graph could be encouraged to trend more toward the upper right diagonal. Groups that progressed successfully in the beginning of the time progression, but became stalled later on, could be offered help to get re-started. In some cases, groups that never move from the origin could be identified as inactive and disbanded or targeted for remedial measures.

Exemplary configuration panel 820 includes groups panel 830 and data panel 840. Groups panel 830 allows the user to select from any of various suitable options for which groups to include in the visualization analysis. Data panel 840 allows the user to select from any of various suitable options for the time frame for which group evolution data is to be presented in the visualization.

As discussed above, it should be appreciated that all of the foregoing exemplary visualizations are provided for example only, and some embodiments are not limited to any particular network analysis visualization or to any particular technique (s) for presentation thereof, e.g., through a user interface.

In some embodiments, a scoring component may be included in networking system 100, or may be provided separately from networking system 100, and may be programmed to compute (e.g., through processing performed by one or more processors of networking system 100, or by one or more separate processing systems) one or more evaluation scores indicating a member's value to a professional community. In some embodiments, this process may include collecting input information corresponding to a number of specified facets to be used in the computation. In some embodiments, some or all of the input information may be stored and/or maintained by profile manager 160, and the scoring component may collect the input information via communication with profile manager 160. Profile manager 160 may in turn receive appropriate inputs from other components (e.g., of networking system 100, and/or of one or more separate systems). Alternatively or additionally, in some embodiments some or all of the input information may be stored and/or managed separately by various components of networking system 100 (and/or other separate system(s)), such as social network component 140 and/or profile manager 160, and the scoring component may collect the input information via communicating accordingly with these various components.

In some exemplary embodiments, as discussed above, input information collected by a scoring component may correspond to facets including learning, effectiveness, informal engagement, profile completion, skills, and external sources. To provide a detailed example of the techniques disclosed herein, these exemplary facets are described further below. However, it should be appreciated that the following discussion is by way of example only, and that aspects of the invention are not limited to any particular number or type of input facets. Some embodiments may not utilize multiple input facets, and some embodiments may utilize different facets than those described below.

In some embodiments, a learning facet may represent a measure of how compliant a member of a professional community is with the formal learning requirements for his/her job, and/or how much initiative the member has taken to formally learn things outside of his/her job requirements. In some embodiments, input information corresponding to the learning facet may be collected by the scoring component from a training manager component, e.g., directly or via profile manager 160. Relevant input information may include what training and/or certification courses, examinations and/ or other offerings have been successfully completed by the member (e.g., as recorded by the training manager component), and/or what relationship various available learning offerings have to the member's current job and/or to other jobs.

In some exemplary embodiments, an aggregate value may be computed for an input facet by assigning quantitative values (such as numbers of points) to specified items of input information, and then combining the resulting quantitative values (such as by summing them) into an aggregate value. In some embodiments, the items of input information specified for consideration and the quantitative values assigned to them may be made constant across the professional community, or across appropriate subsets of the professional community, such that members are evaluated in a consistent fashion. For example, one or more administrators or other suitable personnel may in some embodiments specify the input items to be considered and the quantitative values to be assigned for them for the professional community as a whole, for members of particular job categories, for members of particular manager teams, and/or for any other suitable division of members based on shared characteristics and/or affiliations.

For example, for the learning facet, some possible implementations may add specified numbers of points to an aggregate value for the following items of input information:
  Successful completion(s) of training offering(s), certification requirement(s) and/or other learning offering(s) required for the member's current job.
  Successful completion(s) of training offering(s), certification requirement(s) and/or other learning offering(s) assigned to the member by a manager or administrator, and/or assigned automatically based on a triggering event.
  Successful completion(s) of training offering(s), certification requirement(s) and/or other learning offering(s) in which the member enrolled and which are aligned to recognized job(s) and/or skill(s), although not required for the member's current job and not assigned to the member.
  Social networking actions performed on completed learning offering(s), such as posting information about them to the social network, and/or recommending them to other members of the social network.

In some embodiments, administrator(s) or other suitable personnel may specify the number of points to be assigned to different items of input information to reflect the different levels of importance that different items may have to the particular professional community, to a particular job category, to a particular manager team, and/or based on any other suitable criteria. For example, a professional community in an industry with strict certification requirements may value compliance with certification requirements more heavily than other input items. In another example, a group within a professional community may want to increase collaboration or mentorship within its members, and therefore may assign a higher value to social networking actions than to other input items. In some embodiments, negative points may also be assigned to input items that decrease a member's value to the professional community, such as certifications that become expired or revoked, or required learning offerings that are overdue for completion. In some embodiments, input items and/or assigned points may reflect a proportion of learning requirements completed, rather than or in addition to absolute numbers. Thus, for example, a member who has completed a large proportion of a large number of required learning offerings could receive a higher number of points than a member who has completed all learning requirements but whose job had fewer learning requirements to begin with.

In some embodiments, an effectiveness facet may represent a measure of how well a member performs the formal work involved in his/her job. Any suitable input information may be specified, e.g., by an administrator, for collection to determine this measure. In one example, a member's manager may set goals that the member is expected to achieve, and may input these goals to the member's profile information as managed by profile manager 160. Goals may be of any suitable type and/or form. One example of a suitable goal could be, "Construct 15 widgets within the next month." The member may then report back when the goal is completed, e.g., by updating information managed by profile manager 160. Alternatively or additionally, the member may provide incremental progress reports, such as updating the profile information when a certain percentage of the goal has been completed or a certain number of the total widgets have been constructed. In some embodiments, progress reports and/or completion updates may be collected automatically if appropriate data is available, e.g., about an automatically ascertainable metric such as a member's progress toward a sales quota. In some embodiments, managers and/or other personnel (possibly including other generic members) may provide subjective commentary and/or suggestions for improvement on the member's effectiveness at his/her job. Such commentary and/or suggestions may be input, for example, to profile manager 160, and/or may be posted to the member's online profile as managed by social network component 140. Other inputs may include formal performance review ratings, as well as trends comparing previous years' performance reviews with the most recent performance review. Thus, in some exemplary possible implementations, an aggregate value may be computed for the effectiveness facet through assigning points to the following items of input information:

Goals assigned to the member.
  Goals that the member assigns to him/herself, especially if the member indicates that the self-assigned goals are aligned with other goals assigned to the member.
  Progress updates on goals.
  Completion of goals.
  Commentary and/or suggestions given to the member on the social network.
  Overdue goals not completed (e.g., negative points).
  Performance review trend (e.g., positive or negative).

In some embodiments, an informal engagement facet may represent a measure of a member's influence on other members within the professional community, e.g., through social networking, which may in turn be relevant to assessing the member's impact on the community as a whole. In some embodiments, the scoring component may collect information regarding a member's participation in one or more internal social networks from social network component 140, e.g., directly and/or via profile manager 160. In some embodiments, the input items of information may be specified to take into account the member's influence on others within the social network, as well as the influence others have on the member within the social network. Examples of suitable measures of influence between and among members of a social network are discussed above. Thus, as discussed above, actions performed by the member toward other members of the social network may be monitored and/or otherwise measured, as well as actions performed by others toward the member. In some embodiments, informal interactions not managed by a social network component 140 (such as e-mails and real-world meetings) may also be considered. In some possible implementations, an aggregate value for the informal engagement facet for a member A may be computed by assigning points to input items of information including the following:

Other members following and/or followed by member A.
  Objects contributed and/or shared by member A.
  Other members viewing and/or performing other actions on objects contributed and/or shared by member A.
  Commentary and/or suggestions for improvement provided for member A, and/or other actions performed on member A on the social network, by other members of the social network.

In some embodiments, a profile completion facet may represent a measure of whether a member has posted and/or otherwise input information in a number of specified important categories to the member's profile as managed by profile manager 160, and/or to the member's online profile as available to the social network. In some embodiments, profile elements appropriately important to the professional community may be specified, e.g., by an administrator or other personnel, for tracking for this input facet by the scoring component. In some possible implementations, an aggregate value for the profile completion facet may be computed by assigning points to completed profile elements including the following:

Photograph.
  Job/Business card information.
  Biography.
  Employment history.
  Education.
  Internet profiles.
  Professional interests.
  Expertise.
  Relocation preferences.

In some embodiments, a skills facet may represent a measure of the level to which a member's skills match the requirements for the member's current job. Any suitable input information may be specified, e.g., by an administrator or other suitable personnel, for collection by the scoring component as relevant to the skills measure. In one example, administrator(s), manager(s) and/or other suitable personnel may designate the skills that are required for each job category, and may designate a proficiency level (e.g., on a scale of one to five) required for each skill in a given job category. A member's current proficiency level for a skill may then be determined by a subjective rating on the same scale (e.g., one to five), which may be provided by the member him/herself, a manager, another generic member, and/or any other suitable personnel or any combination of the foregoing. In some embodiments, the combination may be weighted such that ratings provided by, e.g., managers are weighted more heavily than the subjective ratings provided by the members themselves in determining current skill level. In some embodiments, a difference may then be computed between the member's current skill level and the required level for each skill required by the member's job. The differences, representing skill gaps, for all required skills may then be combined (optionally in a weighted fashion) to compute an aggregate value for the skills facet. In addition, in some embodiments, information regarding a member's skills that are not among the set specified (e.g., by an administrator) as required for the member's current job may also be considered as part of the skills facet. In some cases, consideration of these extra skills may aid a professional community in identifying a member as a candidate for another job with a different skill set than the member's current job.

Accordingly, in some possible implementations, an aggregate value for a skills facet may be computed by assigning points to the following items of input information:

Difference between current skill level and required level for each skill (positive or negative points).

Member assigning him/herself a skill (and/or a proficiency level in such skill) not specified (e.g., by an administrator or manager) as required for his/her job, especially if aligned with another job in which the member may be interested.

In some embodiments, an external sources facet may represent a measure of a member's actions performed outside the context of the professional community. As discussed above, one example of an external source from which input information may be collected is an external social network. In some embodiments, an administrator or other suitable personnel may specify a set of external sources to be monitored or analyzed, or from which data is otherwise to be received for computation of an aggregate value for the external sources facet. Such personnel may also specify points to be assigned to specific items of input information. For example, when collecting information regarding a member's participation in one or more external social networks, an administrator may decide how such information should be viewed based on the priorities of the professional community. For a community involved in networking-oriented activities such as sales, information indicating that the member has a high degree of influence in external social networks may be valued positively. However, for a community in an industry such as defense contracting that values secrecy, an administrator may decide to assign negative points to information indicating a high degree of external social networking influence.

As discussed above, it should be appreciated that the foregoing discussion is by way of example only. Any suitable set of one or more input facets may be utilized by a system with a scoring component for evaluating a member of a professional community, as aspects of the invention are not limited in this respect.

In some embodiments, a scoring component may be further configured to combine the aggregate values computed for all of the input facets into a single evaluation score indicating the member's value to the professional community. In some embodiments, the combination may make use of a set of weights allowing some of the input facets to contribute more heavily than others to the evaluation score, in accordance with the needs and values of the professional community. Any suitable set of weights may be used (including equal or unequal weights), as aspects of the invention are not limited in this respect. In some embodiments, administrator(s) and/or other suitable personnel may configure the scoring component with a specified set of weights, depending on the preferences of the particular professional community. For example, some communities may value informal engagement more highly than other facets, while other communities may value formal learning or effectiveness more highly than other facets. In other embodiments, however, a specified set of weights may simply be a default set that is not configured by any administrator or other personnel. In some embodiments, to provide consistency of evaluation and the opportunity for benchmarking, the same set of weights may be applied across the professional community as a whole. However, this is only an example, and aspects of the invention are not limited in this respect. In some alternative embodiments, weights applied to input facets may not be the same for different members, or may only be the same within subsets of the professional community, such as within job categories, within manager teams, or within any other suitable divisions.

In some embodiments, when a member's evaluation score has been computed, it may be stored by profile manager 160, and/or may be displayed via user interface 180 to user portal 110. In some embodiments, a member may be allowed to view or otherwise be provided an indication of his/her current evaluation score at his/her convenience, at any time throughout the year, outside of the context of a formal performance review process. In some embodiments, the evaluation score may be updated outside of the performance review process, for example at predetermined intervals throughout the year, or in response to any suitable triggering event(s). In some embodiments, the updating of the evaluation score may be significantly more frequent than the traditional performance review, such as updating on a monthly, weekly, daily, or even more frequent than daily basis. In some embodiments, a member's evaluation score may be updated any time an item of input information changes in a way that would change the evaluation score. In some embodiments, such real-time dynamic updating and personal access to one's evaluation score may aid a member of a professional community in continuously assessing his/her marketability and maintaining engagement and empowerment in his/her own professional development. In some embodiments, a member may thus be enabled to view his/her evaluation score at some point prior to a formal performance review, to make some positive change to an input facet, and then to have the evaluation score recomputed for the better, before the performance review actually occurs.

In some embodiments, a member may be provided an indication of a normalized version of his/her evaluation score, which may aid the member in benchmarking him/herself against other members of the professional community. For example, in some embodiments, a member's absolute evaluation score may be converted into a percentile with reference to the highest evaluation score currently held by any member of the community, with reference to the highest evaluation score currently held in a subset of the community with which the member is affiliated, with reference to the highest evaluation score ever held in the community, and/or with reference to any other suitable reference value. In other examples, a member's evaluation score may be normalized into a tenth or quartile rather than a percentile, or to any other normalized value that may be useful as a benchmark. Members' absolute evaluation scores and/or normalized evaluation scores, once computed, may be used in any suitable way, as aspects of the invention are not limited in this respect. In the examples described hereafter, references to "evaluation scores" should be understood to refer to absolute scores and/or normalized scores.

In some embodiments, a member's network analysis visualizations and/or evaluation score may not be viewable or otherwise accessible by other generic members of the professional community. In this respect, a member may view his/her own normalized evaluation score and get a sense of how many other members of the community have higher and/or lower evaluation scores than him/herself, but may not be able to determine the identities of other members with higher and/or lower scores. In other embodiments, however, evaluation scores may be made public, e.g., within an internal social network, or among a subset of generic members of the professional community, or an option may be provided to make a member's evaluation score available to one or more other members.

In some embodiments, for example, options may be available to a member, e.g., through social network component 140, to have his/her evaluation score, and/or information about his/her evaluation score, shared with other members of the professional community in various circumstances. Some or all of such options may be available by default, and/or some or all may be configured for availability by an administrator or other suitable personnel. Any suitable options may be provided, as aspects of the invention are not limited in this respect.

In some embodiments, options for members to share their evaluation scores may be configured to promote recognition and/or competition in a game-like style. In one example, a member may be given the option to have a notification posted to the entire social network, or to a specified subset of members on the social network, whenever his/her evaluation score increases, and/or whenever his/her evaluation score reaches a particular threshold. In another example, a member may be given the option to have a notification posted to the entire social network, or to a specified subset of members on the social network, if his/her evaluation score becomes the best of all members in the professional community, and/or of a specified subset of members in the professional community. In another example, a member may be given the option to have a notification sent to a specified other member of the community when the first member's evaluation score becomes higher than the other member's evaluation score. In yet another example, members may be given the option to be listed on a publicly accessible list if their normalized evaluation scores are above a specified threshold, such as the top 1% or the top 10 scores in the community. It should be appreciated, however, that all of the foregoing are merely examples, and any type of sharing options, or no sharing options at all, may be implemented, as aspects of the invention are not limited in this respect. In addition, in some alternate embodiments, sharing options may be activated and/or deactivated solely by discretion of the professional community, e.g., as represented by one or more administrators, or by discretion of other personnel such as managers, without giving a choice to individual members to control how their evaluation scores are shared.

In some embodiments, a member may be provided, e.g., through member interface 182, not only an indication of the member's own evaluation score, but also an indication of one or more of the input facet values that contributed to that score, and/or an indication of how those input facet values were calculated. In some embodiments, this breakdown of a member's evaluation score may also be accessible by one or more other generic members of the professional community. However, in other embodiments, other generic members may not have access to the breakdown of a particular member's evaluation score, even if those other generic members have access to that member's combined score itself.

In some cases, having access to the breakdown of one's own evaluation score into input facets and/or input information items may provide a member with an in-depth understanding of how he/she is being evaluated, of what facets contribute to the evaluation, and of how he/she can take action to improve his/her evaluation. In addition, when a member accesses his/her evaluation score and/or breakdown on a regular basis outside of the formal performance review context, the member may be enabled to retain focus on his/her performance and to be cognizant of what specific actions and/or events cause particular changes in his/her evaluation score. In some embodiments, alerts and/or other notifications may be provided to a member when his/her evaluation score, and/or one or more input facets contributing to his/her evaluation score, improves or declines. When this occurs, by checking to see what new input information contributed to the change, the member may learn about what strategies are more and less effective in improving the member's value to the professional community.

In some embodiments, a member may be provided the capability, e.g., via member interface 182, to make hypothetical changes to one or more of the input facets, and to view how his/her evaluation score would change based on those hypothetical changes. For example, if a member is considering taking a particular action, such as completing a learning offering, teaching a course, setting a new goal for him/herself, being a mentor for another member, or any other suitable action, the member in some embodiments could input this hypothetical future action to the scoring component and have the resulting hypothetical change to his/her evaluation score computed and displayed. In this way, a member may be able to plan an effective strategy for prioritizing actions to most efficiently improve his/her value to the professional community.

In some embodiments, a system such as networking system 100 may be programmed to provide a member of a professional community with automatic recommendations for actions that the member could perform to increase his/her evaluation score. Such recommendations may be determined and/or provided in any suitable way, as aspects of the invention are not limited in this respect. For example, networking system 100 may be programmed and/or otherwise configured (e.g., with input from an administrator or other suitable personnel) with a set of rules specifying how to create recommendations for improving an evaluation score. In one example, the system may highlight for the member one or more of the member's goals that are incomplete or have been inactive. In another example, the system may notify the member of one or more learning offerings that were recently completed by one or more members with higher evaluation scores. In another example, the system may notify the member of one or more members with higher evaluation scores whom the member does not follow on the internal social network, but whom others do follow on the social network. In another example, the system may notify the member of one or more members with lower evaluation scores who do not follow the member, but who do follow one or more other members. In another example, the system may remind the member of one or more profile elements for which the member has not yet provided complete information. In another example, the system may notify the member of one or more learning offerings that were completed by one or more other members having higher skill level assessments. In some of these examples and in others, the system may determine an action to recommend to the member by identifying an action that was previously performed by one or more other members, which resulted in increased evaluation scores for those other members. It should be appreciated, however, that each of the foregoing is merely an example, and aspects of the invention are not limited to any particular technique(s) for providing recommendations.

In some embodiments, regardless of the access rights of other generic members to a particular member's evaluation score and/or breakdown, the particular member's evaluation score and/or breakdown may still be visible to the member's manager(s), and/or to administrators as deemed appropriate, e.g., by the professional community. In some embodiments, managers may use the knowledge of the evaluation scores and/or breakdowns of the members that they manage to implement effective strategies for the development of those members as valuable resources. For example, in some embodiments a manager may view the evaluation scores of members in his/her team to determine who is struggling and may need extra attention, and/or who is excelling and may be able to provide assistance to those who are struggling. In some embodiments, a manager may also view the breakdown of input facets for members in his/her team to determine the specific areas in which members excel and/or struggle, and to determine how best to target improvement efforts. In some embodiments, a system such as networking system 100 may provide a manager the capability to make hypothetical changes to input facets and/or input information items for members in his/her group, and/or may provide automatic recommendations related to members in his/her group, in a similar fashion to that described above for individual members.

In some embodiments, knowledge of the breakdown of input facets for members in a manager's group may aid the manager in identifying members to be assigned to particular tasks. For example, a manager may assign a task requiring a specific skill to a member whose skills facet demonstrates high proficiency in that skill. In another example, a manager may identify a member who is strong in the informal engagement facet as a potential mentor for one or more other members. In some embodiments, evaluation scores and/or breakdowns may provide managers and/or other suitable personnel with useful information for making human resources decisions, such as those related to compensation, hiring and promotion. For example, when a manager must allocate a limited compensation budget among team members who compare relatively equally in some measures such as formal goals and/or skills, the manager may look to other input facets and/or to overall evaluation scores as differentiators to establish differing compensation levels for the team members. In another example, when a job position is open and candidates are being considered for the job, a target evaluation score and/or one or more target values for specific input facets may be set as filters and/or otherwise as relevant criteria to aid in selecting among the available candidates. In some embodiments, target scores may be publicized such that individual members may search for position openings that match their own evaluation scores and/or input facet values, skill sets and/or proficiency levels, and/or any other relevant criteria.

Figure 9:
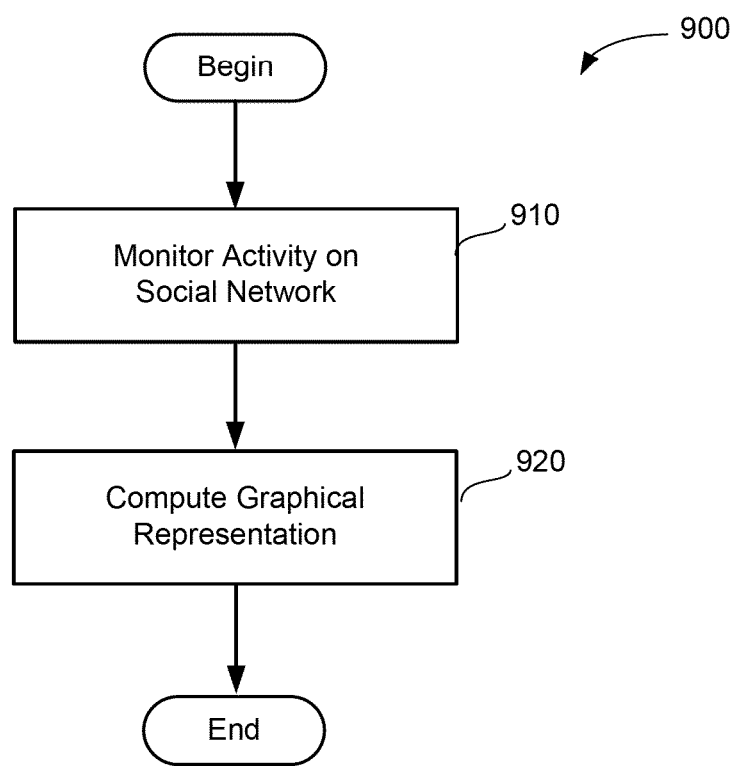
FIG. 9 is a flowchart illustrating an exemplary method for analyzing a social network, in accordance with some embodiments of the present invention.

It should be appreciated from the foregoing that one embodiment of the invention is directed to a method 900 for analyzing a social network, as illustrated in FIG. 9. Method 900 may be performed, for example, by one or more components of a networking system 100 such as social network component 140 and/or network analysis component 170, although other implementations are possible, as method 900 is not limited in this respect. Method 900 begins at act 910, at which activity performed by members on the social network may be monitored. As discussed above, in some embodiments, such activity may include actions other than declaring and undeclaring of connections between members. At act 920, a graphical representation of the social network or portion(s) thereof may be computed. As discussed above, in some embodiments, the graphical representation may be computed to include one or more indications of the activity monitored on the social network. Examples of suitable graphical representations of a social network or portion(s) thereof are discussed above, although other examples are possible.

Figure 10:
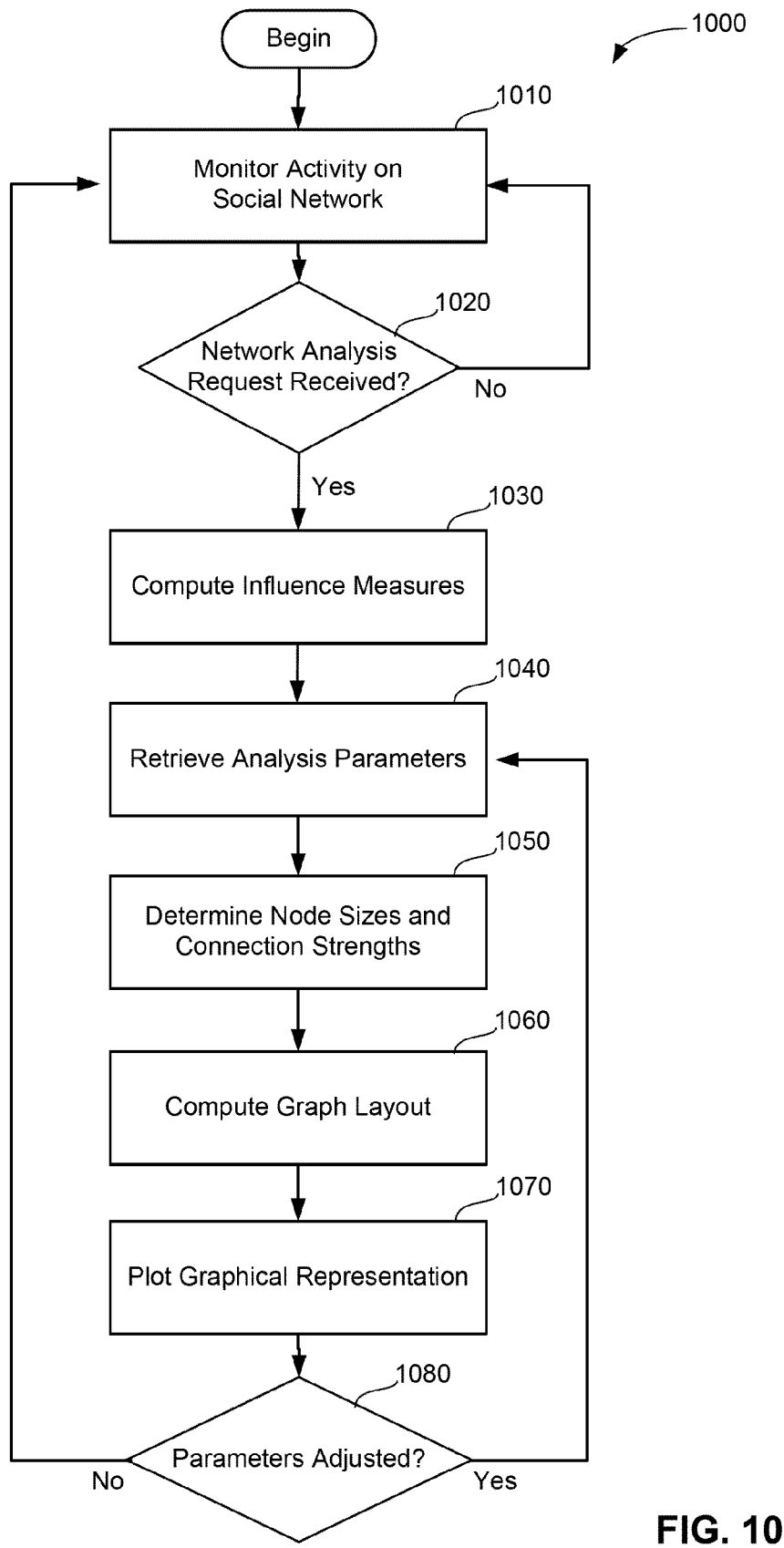
FIG. 10 is a flowchart illustrating a detailed exemplary method for analyzing a social network, in accordance with some embodiments of the present invention.

FIG. 10 illustrates an exemplary detailed method 1000 for analyzing a social network, in accordance with some embodiments of the present invention. Method 1000 may be performed, for example, by one or more components of a networking system 100 such as social network component 140 and/or network analysis component 170, although other implementations are possible, as method 1000 is not limited in this respect. Method 1000 begins at act 1010, at which activity performed by members on the social network may be monitored. As discussed above, in some embodiments, such activity may include actions other than declaring and undeclaring of connections between members. At act 1020, a determination may be made as to whether a network analysis request has been received. For example, a network analysis request may be received when a user (e.g., a member of the social network) logs in to the system (e.g., via a user portal and user interface) and requests to view a network analysis. If no network analysis request is currently received, method 1000 may return to act 1010 to continue monitoring activity on the social network. However, once a network analysis request is received, method 1000 may proceed to act 1030 to compute influence measures. It should be appreciated, however, that this is merely one example, and other paths of processing are possible. For instance, in some embodiments, the analysis system may not always wait to receive a network analysis request before computing influence measures, but may compute influence measures whenever new activity is monitored, and may use the most recently computed influence measures whenever a new network analysis request is received. In yet other embodiments, the evaluation system may compute updated influence measures at regular intervals of time. Any suitable such technique for updating influence measures may be utilized, as aspects of the invention are not limited in this respect.

At act 1040, the set of analysis parameters that is currently enabled may be retried to be applied in generating a graphical representation of the social network or portion(s) thereof. As discussed above, analysis parameters may be specified in any suitable way, including as fixed by default, as specified by an administrator for the entire network, as individually configured by a user, or in any other suitable way. At act 1050, node sizes and connection strengths may be determined, in accordance with the computed influence measures and the currently enabled analysis parameters, for representing members and interactions in the social network. In one example, a node size for each member in the portion of the social network being analyzed may be determined based on the member's combined measures of influence on other members of the social network. In another example, connection strengths between pairs of members may be determined based on the measure of the first member's influence on the second member combined with the measure of the second member's influence on the first member. These are only examples, however, and it should be appreciated that some embodiments are not limited to any particular technique(s) for determining node sizes and/or connection strengths. At act 1060, an overall graph layout that accounts for the node sizes and connection strengths determined in act 1050 may be computed, e.g., using any suitable graph layout optimization technique, as discussed above. At act 1070, the resulting graphical representation of the social network or portion(s) thereof may be plotted and output, e.g., to a display via a user interface, or to a further data processing module, or to any other suitable location. At act 1080, a determination may be made as to whether the analysis parameters have been adjusted, e.g., by user input via a user interface. If it is determined that the analysis parameters have been adjusted, method 1000 may loop back to act 1040, at which the adjusted analysis parameters may be retrieved, and the graphical representation may be re-computed accordingly. If it is determined at act 1080 that no adjustment to the analysis parameters is currently received, method 1000 may return to act 1010, at which further activity may be monitored for use in the next network analysis.

Figure 11:
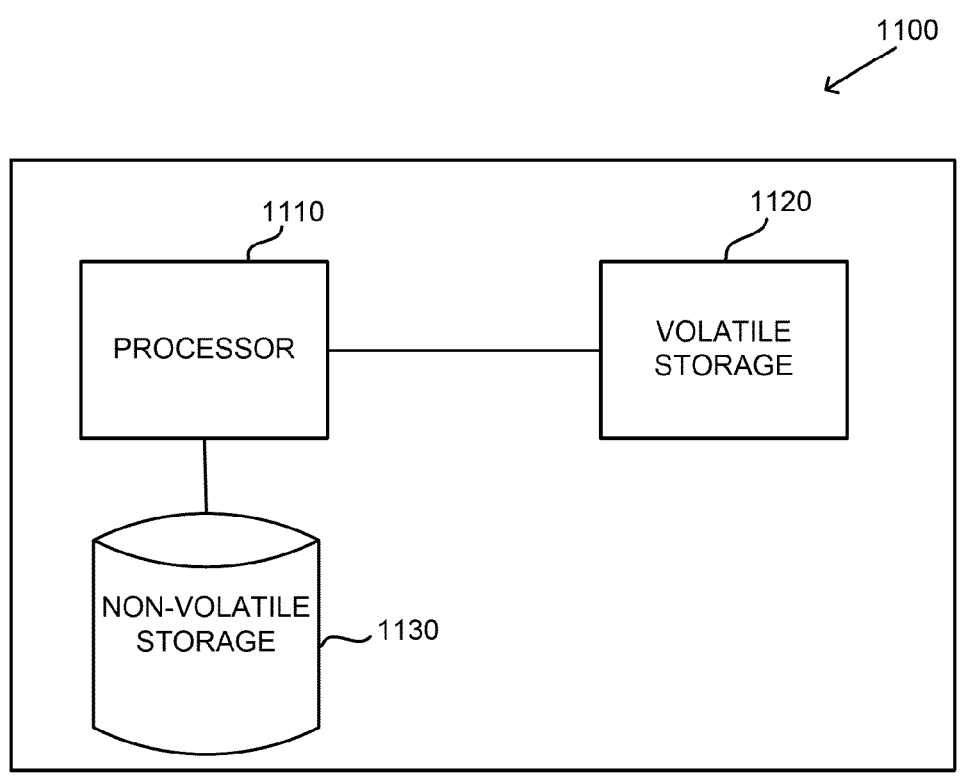
FIG. 11 is a block diagram illustrating an exemplary computer system on which aspects of the present invention may be implemented.

A system for analyzing a social network in accordance with the techniques described herein may take any suitable form, as aspects of the present invention are not limited in this respect. An illustrative implementation of a computer system 1100 that may be used in connection with some embodiments of the present invention is shown in FIG. 11. One or more computer systems such as computer system 1100 may be used to implement any of the functionality described above. The computer system 1100 may include one or more processors 1110 and one or more computer-readable storage media (i.e., tangible, non-transitory computer-readable media), e.g., volatile storage 1120 and one or more non-volatile storage media 1130, which may be formed of any suitable non-volatile data storage media. The processor 1110 may control writing data to and reading data from the volatile storage 1120 and/or the non-volatile storage device 1130 in any suitable manner, as aspects of the present invention are not limited in this respect. To perform any of the functionality described herein, processor 1110 may execute one or more instructions stored in one or more computer-readable storage media (e.g., volatile storage 1120), which may serve as tangible, non-transitory computer-readable media storing instructions for execution by processor 1110.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of embodiments of the present invention comprises at least one computer-readable storage medium (i.e., at least one tangible, non-transitory computer-readable medium, e.g., a computer memory, a floppy disk, a compact disk, a magnetic tape, or other tangible, non-transitory computer-readable medium) encoded with a computer program (i.e., a plurality of instructions), which, when executed on one or more processors, performs above-discussed functions of embodiments of the present invention. The computer-readable storage medium can be transportable such that the program stored thereon can be loaded onto any computer resource to implement aspects of the present invention discussed herein. In addition, it should be appreciated that the reference to a computer program which, when executed, performs above-discussed functions, is not limited to an application program running on a host computer. Rather, the term "computer program" is used herein in a generic sense to reference any type of computer code (e.g., software or microcode) that can be employed to program one or more processors to implement above-discussed aspects of the present invention.

The phraseology and terminology used herein is for the purpose of description and should not be regarded as limiting. The use of "including," "comprising," "having," "containing," "involving," and variations thereof, is meant to encompass the items listed thereafter and additional items. Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method for analyzing a social network having a plurality of members, each member having declared a connection with each of one or more other members of the social network, the method comprising:
   monitoring activity performed by members on the social network, the activity comprising actions other than declaring and undeclaring of connections between members; and
   computing, using at least one processor, a graphical representation of at least a portion of the social network, the graphical representation comprising at least one indication of the monitored activity;
   wherein computing the graphical representation comprises:
      including in the graphical representation nodes representing members of the at least a portion of the social network; and
      visually distinguishing nodes representing members who joined the social network within a specified period of time from nodes representing other members of the at least a portion of the social network.

2. The method of claim 1, wherein the monitored activity comprises actions performed for purposes other than analyzing the social network.

3. The method of claim 1, wherein the monitoring comprises determining a measure of a first member's influence on a second member in the social network.

4. The method of claim 3, wherein the measure of the first member's influence on the second member is determined based at least in part on at least one monitored action selected from the group consisting of:
   the second member declaring a connection with the first member;
   the first member viewing and/or performing an action on an object contributed by the second member;
   the second member viewing and/or performing an action on an object contributed by the first member;
   the first member sharing an object with the second member;
   the second member sharing an object with the first member;
   the first member providing an impression on the second member; and
   the second member providing an impression on the first member.

5. The method of claim 3, wherein computing the graphical representation comprises including in the graphical representation a node representing the first member, the node having at least one visual characteristic determined based at least in part on the measure of the first member's influence on the second member.

6. The method of claim 5, wherein computing the graphical representation comprises determining a size of the node based at least in part on the first member's influence on other members of the social network.

7. The method of claim 3, wherein computing the graphical representation comprises:
   including in the graphical representation a first node representing the first member and a second node representing the second member; and
   determining a proximity between the first node and the second node in the graphical representation based at least in part on the measure of the first member's influence on the second member.

8. The method of claim 3, wherein computing the graphical representation comprises:
   including in the graphical representation a first node representing the first member and a second node representing the second member; and
   including in the graphical representation a connector between the first node and the second node, the connector having at least one visual characteristic determined based at least in part on the measure of the first member's influence on the second member.

9. The method of claim 8, wherein computing the graphical representation comprises determining a thickness of the connector and/or a proximity between the first node and the second node based at least in part on the measure of the first member's influence on the second member and/or on a measure of the second member's influence on the first member.

10. The method of claim 1, further comprising applying to the graphical representation at least one filter selected from the group consisting of a location filter, an organization filter, a job type filter, a job level filter, and a group filter.

11. The method of claim 1, wherein computing the graphical representation comprises:
    determining a measure of influence for each of at least some of the plurality of members in the social network;
    including in the graphical representation a node representing each of the at least some of the plurality of members; and
    visually distinguishing nodes representing members whose measure of influence is above a threshold from nodes representing members whose measure of influence is below the threshold.

12. A method for analyzing a social network having a plurality of members, each member having declared a connection with each of one or more other members of the social network, the method comprising:
    monitoring activity performed by members on the social network, the activity comprising actions other than declaring and undeclaring of connections between members; and
    computing, using at least one processor, a graphical representation of at least a portion of the social network, the graphical representation comprising at least one indication of the monitored activity;
    wherein computing the graphical representation comprises:
       including in the graphical representation nodes representing members of the at least a portion of the social network; and
       including in the graphical representation connectors between nodes representing members who influence each other in the social network;
    wherein a connector between a node representing a first member and a node representing a second member is not included in the graphical representation if the first member has declared a connection with the second member, and/or if the second member has declared a connection with the first member.

13. The method of claim 1, wherein computing the graphical representation comprises:
    including in the graphical representation nodes representing members of the at least a portion of the social network;
    determining proximities between nodes in the graphical representation based at least in part on measures of influence between the members represented by the nodes; and
    in response to a request from a user to reduce visual complexity of the graphical representation, altering the graphical representation to decrease the proximities between nodes.

14. The method of claim 13, wherein altering the graphical representation comprises changing an angular position of a first node relative to a second node in the graphical representation.

15. The method of claim 1, further comprising:
    in response to a user selection of a first member of the social network, recomputing the graphical representation as if the first member were not a member of the social network.

16. The method of claim 1, wherein computing the graphical representation comprises:
    including in the graphical representation a first node representing a first member and a plurality of other nodes representing other members having influence on the first member in the social network; and
    for each of the plurality of other nodes, determining a proximity between the other node and the first node in the graphical representation based at least in part on a measure of influence on the first member of the other member represented by the other node.

17. The method of claim 1, wherein computing the graphical representation comprises:
    including in the graphical representation a first node representing a first member and a plurality of other nodes representing other members that the first member influences in the social network; and
    for each of the plurality of other nodes, determining a proximity between the other node and the first node in the graphical representation based at least in part on a measure of influence of the first member on the other member represented by the other node.

18. The method of claim 1, wherein computing the graphical representation comprises:
    including in the graphical representation a plurality of nodes, each of the plurality of nodes representing a group of members of the social network; and
    positioning the plurality of nodes in the graphical representation to indicate comparative levels of activity of the groups represented by the nodes.

19. Apparatus comprising:
    at least one processor; and
    at least one non-transitory storage medium storing processor-executable instructions that, when executed by the at least one processor, perform a method for analyzing a social network having a plurality of members, each member having declared a connection with each of one or more other members of the social network, the method comprising:

monitoring activity performed by members on the social network, the activity comprising actions other than declaring and undeclaring of connections between members; and computing a graphical representation of at least a portion of the social network, the graphical representation comprising at least one indication of the monitored activity;

wherein computing the graphical representation comprises:

including in the graphical representation nodes representing members of the at least a portion of the social network; and visually distinguishing nodes representing members who joined the social network within a specified period of time from nodes representing other members of the at least a portion of the social network.

20. The apparatus of claim 19, wherein the monitored activity comprises actions performed for purposes other than analyzing the social network.

21. The apparatus of claim 19, wherein the monitoring comprises determining a measure of a first member's influence on a second member in the social network.

22. The apparatus of claim 21, wherein the measure of the first member's influence on the second member is determined based at least in part on at least one monitored action selected from the group consisting of:

the second member declaring a connection with the first member;

the first member viewing and/or performing an action on an object contributed by the second member;

the second member viewing and/or performing an action on an object contributed by the first member;

the first member sharing an object with the second member;

the second member sharing an object with the first member;

the first member providing an impression on the second member; and the second member providing an impression on the first member.

23. The apparatus of claim 21, wherein computing the graphical representation comprises including in the graphical representation a node representing the first member, the node having at least one visual characteristic determined based at least in part on the measure of the first member's influence on the second member.

24. The apparatus of claim 23, wherein computing the graphical representation comprises determining a size of the node based at least in part on the first member's influence on other members of the social network.

25. The apparatus of claim 21, wherein computing the graphical representation comprises:

including in the graphical representation a first node representing the first member and a second node representing the second member; and determining a proximity between the first node and the second node in the graphical representation based at least in part on the measure of the first member's influence on the second member.

26. The apparatus of claim 21, wherein computing the graphical representation comprises:

including in the graphical representation a first node representing the first member and a second node representing the second member; and including in the graphical representation a connector between the first node and the second node, the connector having at least one visual characteristic determined based at least in part on the measure of the first member's influence on the second member.

27. The apparatus of claim 26, wherein computing the graphical representation comprises determining a thickness of the connector and/or a proximity between the first node and the second node based at least in part on the measure of the first member's influence on the second member and/or on a measure of the second member's influence on the first member.

28. The apparatus of claim 19, wherein the method further comprises applying to the graphical representation at least one filter selected from the group consisting of a location filter, an organization filter, a job type filter, a job level filter, and a group filter.

29. The apparatus of claim 19, wherein computing the graphical representation comprises:

determining a measure of influence for each of at least some of the plurality of members in the social network;

including in the graphical representation a node representing each of the at least some of the plurality of members; and visually distinguishing nodes representing members whose measure of influence is above a threshold from nodes representing members whose measure of influence is below the threshold.

30. Apparatus comprising:

at least one processor; and at least one non-transitory storage medium storing processor-executable instructions that, when executed by the at least one processor, perform a method for analyzing a social network having a plurality of members, each member having declared a connection with each of one or more other members of the social network, the method comprising:

monitoring activity performed by members on the social network, the activity comprising actions other than declaring and undeclaring of connections between members; and computing a graphical representation of at least a portion of the social network, the graphical representation comprising at least one indication of the monitored activity;

wherein computing the graphical representation comprises:

including in the graphical representation nodes representing members of the at least a portion of the social network; and including in the graphical representation connectors between nodes representing members who influence each other in the social network;

wherein a connector between a node representing a first member and a node representing a second member is not included in the graphical representation if the first member has declared a connection with the second member, and/or if the second member has declared a connection with the first member.

31. The apparatus of claim 19, wherein computing the graphical representation comprises:

including in the graphical representation nodes representing members of the at least a portion of the social network;

determining proximities between nodes in the graphical representation based at least in part on measures of influence between the members represented by the nodes; and in response to a request from a user to reduce visual complexity of the graphical representation, altering the graphical representation to decrease the proximities between nodes.

32. The apparatus of claim 31, wherein altering the graphical representation comprises changing an angular position of a first node relative to a second node in the graphical representation.

33. The apparatus of claim 19, wherein the method further comprises:
in response to a user selection of a first member of the social network, recomputing the graphical representation as if the first member were not a member of the social network.

34. The apparatus of claim 19, wherein computing the graphical representation comprises:
including in the graphical representation a first node representing a first member and a plurality of other nodes representing other members having influence on the first member in the social network; and
for each of the plurality of other nodes, determining a proximity between the other node and the first node in the graphical representation based at least in part on a measure of influence on the first member of the other member represented by the other node.

35. The apparatus of claim 19, wherein computing the graphical representation comprises:
including in the graphical representation a first node representing a first member and a plurality of other nodes representing other members that the first member influences in the social network; and
for each of the plurality of other nodes, determining a proximity between the other node and the first node in the graphical representation based at least in part on a measure of influence of the first member on the other member represented by the other node.

36. The apparatus of claim 19, wherein computing the graphical representation comprises:
including in the graphical representation a plurality of nodes, each of the plurality of nodes representing a group of members of the social network; and
positioning the plurality of nodes in the graphical representation to indicate comparative levels of activity of the groups represented by the nodes.

37. At least one non-transitory computer-readable storage medium encoded with instructions that, when executed, perform a method for analyzing a social network having a plurality of members, each member having declared a connection with each of one or more other members of the social network, the method comprising:
monitoring activity performed by members on the social network, the activity comprising actions other than declaring and undeclaring of connections between members; and
computing a graphical representation of at least a portion of the social network, the graphical representation comprising at least one indication of the monitored activity;
wherein computing the graphical representation comprises:
including in the graphical representation nodes representing members of the at least a portion of the social network; and
visually distinguishing nodes representing members who joined the social network within a specified period of time from nodes representing other members of the at least a portion of the social network.

38. The at least one non-transitory computer-readable storage medium of claim 37, wherein the monitored activity comprises actions performed for purposes other than analyzing the social network.

39. The at least one non-transitory computer-readable storage medium of claim 37, wherein the monitoring comprises determining a measure of a first member's influence on a second member in the social network.

40. The at least one non-transitory computer-readable storage medium of claim 39, wherein the measure of the first member's influence on the second member is determined based at least in part on at least one monitored action selected from the group consisting of:
the second member declaring a connection with the first member;
the first member viewing and/or performing an action on an object contributed by the second member;
the second member viewing and/or performing an action on an object contributed by the first member;
the first member sharing an object with the second member;
the second member sharing an object with the first member;
the first member providing an impression on the second member; and
the second member providing an impression on the first member.

41. The at least one non-transitory computer-readable storage medium of claim 39, wherein computing the graphical representation comprises including in the graphical representation a node representing the first member, the node having at least one visual characteristic determined based at least in part on the measure of the first member's influence on the second member.

42. The at least one non-transitory computer-readable storage medium of claim 41, wherein computing the graphical representation comprises determining a size of the node based at least in part on the first member's influence on other members of the social network.

43. The at least one non-transitory computer-readable storage medium of claim 39, wherein computing the graphical representation comprises:
including in the graphical representation a first node representing the first member and a second node representing the second member; and
determining a proximity between the first node and the second node in the graphical representation based at least in part on the measure of the first member's influence on the second member.

44. The at least one non-transitory computer-readable storage medium of claim 39, wherein computing the graphical representation comprises:
including in the graphical representation a first node representing the first member and a second node representing the second member; and
including in the graphical representation a connector between the first node and the second node, the connector having at least one visual characteristic determined based at least in part on the measure of the first member's influence on the second member.

45. The at least one non-transitory computer-readable storage medium of claim 44, wherein computing the graphical representation comprises determining a thickness of the connector and/or a proximity between the first node and the second node based at least in part on the measure of the first member's influence on the second member and/or on a measure of the second member's influence on the first member.

46. The at least one non-transitory computer-readable storage medium of claim 37, wherein the method further comprises applying to the graphical representation at least one filter selected from the group consisting of a location filter, an organization filter, a job type filter, a job level filter, and a group filter.

47. The at least one non-transitory computer-readable storage medium of claim 37, wherein computing the graphical representation comprises:
determining a measure of influence for each of at least some of the plurality of members in the social network;
including in the graphical representation a node representing each of the at least some of the plurality of members; and
visually distinguishing nodes representing members whose measure of influence is above a threshold from nodes representing members whose measure of influence is below the threshold.

48. At least one non-transitory computer-readable storage medium encoded with instructions that, when executed, perform a method for analyzing a social network having a plurality of members, each member having declared a connection with each of one or more other members of the social network, the method comprising:
monitoring activity performed by members on the social network, the activity comprising actions other than declaring and undeclaring of connections between members; and
computing a graphical representation of at least a portion of the social network, the graphical representation comprising at least one indication of the monitored activity;
wherein computing the graphical representation comprises:
including in the graphical representation nodes representing members of the at least a portion of the social network; and
including in the graphical representation connectors between nodes representing members who influence each other in the social network;
wherein a connector between a node representing a first member and a node representing a second member is not included in the graphical representation if the first member has declared a connection with the second member, and/or if the second member has declared a connection with the first member.

49. The at least one non-transitory computer-readable storage medium of claim 37, wherein computing the graphical representation comprises:
including in the graphical representation nodes representing members of the at least a portion of the social network;
determining proximities between nodes in the graphical representation based at least in part on measures of influence between the members represented by the nodes; and
in response to a request from a user to reduce visual complexity of the graphical representation, altering the graphical representation to decrease the proximities between nodes.

50. The at least one non-transitory computer-readable storage medium of claim 49, wherein altering the graphical representation comprises changing an angular position of a first node relative to a second node in the graphical representation.

51. The at least one non-transitory computer-readable storage medium of claim 37, wherein the method further comprises:
in response to a user selection of a first member of the social network, recomputing the graphical representation as if the first member were not a member of the social network.

52. The at least one non-transitory computer-readable storage medium of claim 37, wherein computing the graphical representation comprises:
including in the graphical representation a first node representing a first member and a plurality of other nodes representing other members having influence on the first member in the social network; and
for each of the plurality of other nodes, determining a proximity between the other node and the first node in the graphical representation based at least in part on a measure of influence on the first member of the other member represented by the other node.

53. The at least one non-transitory computer-readable storage medium of claim 37, wherein computing the graphical representation comprises:
including in the graphical representation a first node representing a first member and a plurality of other nodes representing other members that the first member influences in the social network; and
for each of the plurality of other nodes, determining a proximity between the other node and the first node in the graphical representation based at least in part on a measure of influence of the first member on the other member represented by the other node.

54. The at least one non-transitory computer-readable storage medium of claim 37, wherein computing the graphical representation comprises:
including in the graphical representation a plurality of nodes, each of the plurality of nodes representing a group of members of the social network; and
positioning the plurality of nodes in the graphical representation to indicate comparative levels of activity of the groups represented by the nodes.

* * * * *